United States Patent
Cheng et al.

(10) Patent No.: US 11,251,909 B2
(45) Date of Patent: Feb. 15, 2022

(54) REDUNDANCY VERSIONS IN A HYBRID AUTOMATIC REPEAT REQUEST, HARQ PROCESS

(71) Applicant: Telefonaktiebolaget LM Ericsson (publ), Stockholm (SE)

(72) Inventors: Jung-Fu Cheng, Fremont, CA (US); Reem Karaki, Aachen (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 120 days.

(21) Appl. No.: 16/637,193

(22) PCT Filed: Aug. 7, 2018

(86) PCT No.: PCT/EP2018/071423
§ 371 (c)(1),
(2) Date: Feb. 6, 2020

(87) PCT Pub. No.: WO2019/030236
PCT Pub. Date: Feb. 14, 2019

(65) Prior Publication Data
US 2020/0228250 A1 Jul. 16, 2020

Related U.S. Application Data

(60) Provisional application No. 62/544,575, filed on Aug. 11, 2017.

(51) Int. Cl.
*H04L 1/18* (2006.01)
*H04L 1/00* (2006.01)
*H04L 5/00* (2006.01)

(52) U.S. Cl.
CPC ......... *H04L 1/1819* (2013.01); *H04L 1/0003* (2013.01); *H04L 1/1835* (2013.01); *H04L 5/0055* (2013.01)

(58) Field of Classification Search
None
See application file for complete search history.

(56) References Cited

U.S. PATENT DOCUMENTS

2006/0179387 A1* 8/2006 Taffin ............... H04L 1/1874
714/746
2008/0090517 A1 4/2008 Cheng
(Continued)

FOREIGN PATENT DOCUMENTS

WO 2006030019 A2 3/2006
WO 2013115690 A1 8/2013

OTHER PUBLICATIONS

International Search Report and Written Opinion dated Nov. 16, 2018 for International Application No. PCT/EP2018/071423 filed on Aug. 7, 2018.
(Continued)

*Primary Examiner* — Saad Khawar
(74) *Attorney, Agent, or Firm* — Christopher & Weisberg, P.A.

(57) ABSTRACT

Apparatus and methods for performing a hybrid automatic repeat request, HARQ, process are disclosed. In one embodiment, a method in a wireless device for transmission of redundancy versions in a HARQ process includes determining, by the wireless device, a redundancy version, RV, for transmission by the wireless device, the RV being based at least on a coding rate and performing a transmission according to the determined RV. In one embodiment, a method in a network node is provided including receiving, from a wireless device, a transmission corresponding to a redundancy version, RV, the RV being based at least on a coding rate.

19 Claims, 11 Drawing Sheets

(56) References Cited

U.S. PATENT DOCUMENTS

| | | | |
|---|---|---|---|
| 2009/0238066 A1* | 9/2009 | Cheng | H04L 1/0067 370/216 |
| 2010/0309793 A1* | 12/2010 | Choi | H04L 1/0027 370/252 |
| 2021/0203450 A1* | 7/2021 | Xu | H04L 1/1819 |

OTHER PUBLICATIONS

3GPP TSG RAN WG1 Meeting #91 R1-1720933; Title: RV selection fro AUL transmissions; Source: Ericsson; Agenda Item: 6.2.2.2.4; Document for: Discussion and Decision; Location and Date: Reno, US, Nov. 27-Dec. 1, 2017, consisting of 3-pages.

3GPP TS 36.300 V14.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); Jun. 2017, consisting of 331-pages.

3GPP TS 36.212 V14.1.1; 3rd Generation Partnership Project; Technical Specification Group Radio Access Network; Evolved Universal Terrestrial Radio Access (E-UTRA); Multiplexing and channel coding (Release 14); Jul. 2017, consisting of 149-pages.

* cited by examiner

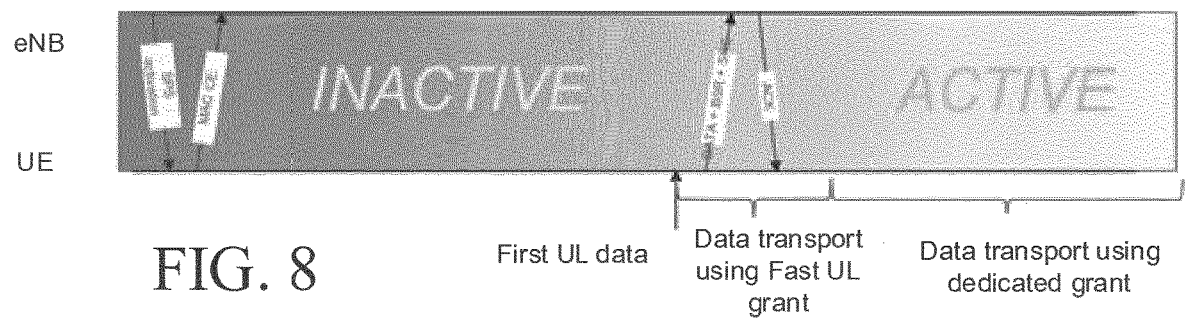
FIG. 8    First UL data | Data transport using Fast UL grant | Data transport using dedicated grant
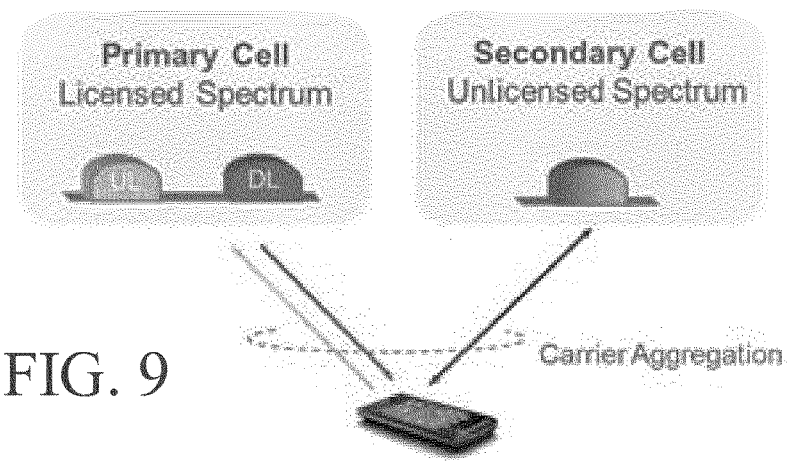
FIG. 9

REDUNDANCY VERSIONS IN A HYBRID AUTOMATIC REPEAT REQUEST, HARQ PROCESS

CROSS-REFERENCE TO RELATED APPLICATIONS

This application is a Submission Under 35 U.S.C. § 371 for U.S. National Stage Patent Application of International Application No.: PCT/EP2018/071423, filed Aug. 7, 2018 entitled "REDUNDANCY VERSIONS IN A HYBRID AUTOMATIC REPEAT REQUEST, HARQ PROCESS," which claims priority to U.S. Provisional Application No. 62/544,575, filed Aug. 11, 2017, entitled "RV VALUE SELECTION FOR AUTONOMOUS/GRANT-LESS UL TRANSMISSIONS," the entireties of both of which are incorporated herein by reference.

TECHNICAL FIELD

This disclosure relates to redundancy versions in a hybrid automatic repeat request, HARQ, process.

BACKGROUND

The third generation partnership project (3GPP) work on "Licensed-Assisted Access" (LAA) intends to allow long term evolution (LTE) equipment to also operate in the unlicensed radio spectrum. Candidate bands for LTE operation in the unlicensed spectrum may include 5 GHz, 3.5 GHz, etc. The unlicensed spectrum can be used as a complement to the licensed spectrum or may allow completely standalone operation.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework enables aggregation of two or more carriers with the condition that at least one carrier (or frequency channel) is in the licensed spectrum and at least one carrier is in the unlicensed spectrum. In the standalone (or completely unlicensed spectrum) mode of operation, one or more carriers may be selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum may be shared with other radios of similar or dissimilar wireless technologies, a so called listen-before-talk (LBT) method may be applied. LBT involves sensing the medium for a pre-defined minimum amount of time and backing off if the channel is busy. Due to the centralized coordination and dependency of terminal devices on the base-station (e.g., eNB, gNB) for channel access in LTE operation and imposed LBT regulations, LTE uplink (UL), i.e., from the wireless device to the network node such as the base station, performance may be especially hampered. UL transmission is becoming more and more important with user-centric applications and the need for pushing data to the cloud.

Today, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better uplink (UL) performance characteristics, especially in congested network conditions.

LTE uses orthogonal frequency division multiplexing (OFDM) in the downlink and discrete Fourier transform (DFT)-spread OFDM (also referred to as single-carrier frequency division multiple access (SC-FDMA)) in the uplink. The basic LTE downlink physical resource can thus be seen as a time-frequency grid as illustrated, for example, in FIG. 1 where each resource element corresponds to one OFDM subcarrier during one OFDM symbol interval. The uplink subframe may have the same subcarrier spacing as the downlink and the same number of SC-FDMA symbols in the time domain as OFDM symbols in the downlink.

In the time domain, LTE downlink transmissions may be organized into radio frames of 10 ms, each radio frame consisting of ten equally-sized subframes of length Tsubframe=1 ms as shown, for example, in FIG. 1. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block may correspond to one slot (e.g., 0.5 ms) in the time domain and 12 contiguous subcarriers in the frequency domain. A pair of two adjacent resource blocks in time direction (e.g., 1.0 ms) may be known as a resource block pair. Resource blocks are numbered in the frequency domain, starting with 0 from one end of the system bandwidth.

Downlink transmissions may be dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe may also contain common reference symbols, which are known to the receiver and are used for coherent demodulation of, e.g., the control information. A downlink system with CFI=3 OFDM symbols as control is illustrated in FIG. 3, as an example. The reference symbols shown in FIG. 3 are the cell specific reference symbols (CRS) and are used to support multiple functions including fine time and frequency synchronization and channel estimation for certain transmission modes.

Uplink transmissions may be dynamically scheduled, i.e., in each downlink subframe the base station transmits control information about which terminals should transmit data to, for example, the evolved node B (eNB) base station in subsequent subframes, and upon which resource blocks the data is transmitted. The uplink resource grid may be comprised of data and uplink control information in the physical uplink shared channel (PUSCH), uplink control information in the physical uplink control channel (PUCCH), and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS may be time-multiplexed into the UL subframe, and SRS may always be transmitted in the last symbol of a normal UL subframe. The PUSCH DMRS may be transmitted once every slot for subframes with normal cyclic prefix, and can be located in the fourth and eleventh single carrier (SC)-FDMA symbols.

From LTE Rel-11 onwards, downlink (DL), i.e., from the network node to the wireless device, or UL resource assignments can also be scheduled on the enhanced Physical Downlink Control Channel (EPDCCH). For Rel-8 to Rel-10 only the Physical Downlink Control Channel (PDCCH) is available. Resource grants are wireless device-specific and may be indicated by scrambling the downlink control information (DCI) Cyclic Redundancy Check (CRC) with the wireless device-specific cell-radio network temporary identifier (C-RNTI). A unique C-RNTI may be assigned by a cell to every wireless device associated with it, and can take values in the range 0001-FFF3 in hexadecimal format. A wireless device uses the same C-RNTI on all serving cells. An uplink subframe is shown in FIG. 4.

LTE Hybrid Automatic Repeat Request (HARQ) Operations

In LTE system, HARQ protocol is used to enhance transmission reliability. When an initial transmission is not received correctly by the receiver, the receiver stores the received signal in a soft buffer and signals to the transmitter of such unsuccessful transmission as illustrated in FIG. 5, as an example. The transmitter can then retransmit the information (referred to as the transport block in LTE specifications) using the same channel coded bits or different channel coded bits. The receiver can then combine the retransmission signal with that stored in the soft buffer. Such combining of signals greatly enhances the reliability of the transmission.

In the LTE system, the data transmission may be protected by a rate 1/3 turbo code. To simplify signaling and operation complexity, a conceptual model referred to as the circular buffer can be used in the LTE HARQ operations. This circular buffer model is illustrated in FIG. 6, as an example, for the case of single spatial layer transmission. The buffer consists of 32 columns of systematic bits followed by 64 columns of parity bits generated by the turbo encoder. The number of rows depends on the size of the code block to be transmitted. For example, the number of rows equals 193 when the code block size is 6144 bits.

To simplify the signaling of what bits are transmitted to the receiver, four redundancy versions are defined. Each redundancy version (RV) may be defined as the bits that can be read out of the circular buffer column-by-column starting from the head of a specific column in the circular buffer. The starting points of the four redundancy versions RV=0, 1, 2 and 3 are the heads of column #2, #26, #50 and #74 (note the numbering of columns starts from 0). For a transmission using a specific redundancy version, the transmitter reads the bits starting from the start of the redundancy version until the necessary amount of bits are obtained. If the reading reaches the end of the buffer and still more bits are needed, the reading of bits then resumes from the beginning of the buffer.

In the case of multi-spatial layer transmission, two transport blocks are transmitted in LTE. For the downlink, the circular buffer size is cut in half by discarding part of the parity bits. More specifically, the circular buffer model is illustrated in FIG. 7, as an example, for the case of multi-spatial layer transmission. In this case, the buffer consists of 32 columns of systematic bits followed by 16 columns of parity bits generated by the turbo encoder. The starting points of the four redundancy versions RV=0, 1, 2 and 3 are the heads of column #2, #14, #26 and #38 (note the numbering of columns starts from 0).

It can be appreciated by one skilled in the art that it is generally advantageous to perform retransmission that carries more bits that have not been transmitted in previous transmission attempts. For instance, in a so-called Chase combining protocol, the transmitter sends initial transmission using RV=0 and resends subsequent retransmissions also using RV=0. Such a simple HARQ protocol mostly provides benefits from combining the signal energy from the transmissions resulting in, for example, a 3 dB gain for 2 transmissions and 4.8 dB for 3 transmissions. On the other hand, in a so-called incremental redundancy protocol, the transmitter picks a redundancy version (RV) that shares at least a number of bits as the redundancy version that was used in the initial transmissions. This HARQ protocol provides both an energy gain and additional coding gains. Using the highest rate transmission using 256 quadrature amplitude modulation (QAM) as an example, 8.4 dB gain can be obtained after 2 transmissions and 11.3 dB gain can be obtained after 3 transmissions.

Rel-14 Semi Persistent Scheduling (SPS)

With semi persistent scheduling the signaling delay-overhead imparting dynamic scheduling in LTE is overcome. While dynamically scheduling in LTE, the wireless device should be granted with UL radio resources, which it must request as part of the scheduling request (SR) procedure, in integrated services digital network (ISDN) user adaptation (IUA), a long lasting grant for uplink resources is provided by the base station even before UL data becomes available in the wireless device. The grant indicates recurring resources that the wireless device may use, if data becomes available, but does not mandate the wireless device to do a padding transmission, in case no UL data is available. This way the UL access latency is reduced, while wireless device power consumption and uplink interference is not increased.

The basic concept is illustrated in FIG. 8. To speed up small data transmissions in UL (e.g. transmission control protocol (TCP) acknowledgements (ACKs)), wireless devices are configured with an SPS grant, i.e., a small recurring UL resource. While no data is available, the wireless device is in an inactive phase, i.e. does not use the granted resources. Once data becomes available, it can instantly (i.e. on the next available SPS resource) transmit the data, ensuring a low latency. If the base station realizes, e.g. based on a received buffer status request (BSR) that larger amounts of UL data are available, the base station would provide the wireless device with dynamic grants of a larger resource allocation. This would be considered the active phase.

Within the 3GPP Rel-14 work item, enhanced version of SPS was standardized. Thereby, more frequent occurrences of SPS subframes have been introduced, i.e. shorter periods of down to 1 ms are configurable, and the mandate to send padding if no data is available has been removed. It had been further specified that reception of the provided SPS grant (or release) is to be confirmed by the wireless device with a medium access control (MAC) control element. This way the base station is sure that the wireless device is configured with SPS (or released of SPS). Further, non-adaptive retransmissions in SPS are enabled on SPS-resources. In fact, non-adaptive retransmissions are prioritized over sending newly available data. (Note that previously on SPS resources, only new transmissions were done).

For the base station, SPS comes with the following complexities: when an uplink transmission is skipped by the wireless device, the base station does not necessarily know of the skip or is unable to identify if the wireless device skipped the transmission or if the transmission had failed. One proposal to solve this dilemma is by having the base station always sending a non-acknowledgment (NACK) on the physical HARQ indicator channel (PHICH) in these cases. The wireless device would, if it had sent data previously, attempt a retransmission; otherwise ignore the NACK. This way, the wireless device data cannot be mistakenly considered as having acknowledged (ACKed), in which case the HARQ buffer for the retransmission may be overridden by a new data transmission. Furthermore, HARQ retransmissions can be configured with a fixed redundancy version, which is helpful for the base station, since it might have missed the first transmission and thus might not be able to decode a subsequent retransmission with an unexpected redundancy version.

Licensed-Assisted Access (LAA) to Unlicensed Spectrum Using LTE

Up to now, the spectrum used by LTE is generally dedicated to LTE. This has the advantage that the LTE system does not need to care about the coexistence issue and the spectrum efficiency can be maximized. However, the spectrum allocated to LTE is limited and cannot meet the ever increasing demand for larger throughput from applications and services. Therefore, Rel-13 LAA extended LTE to exploit unlicensed spectrum in addition to licensed spectrum, see for example 3GPP TS 36.300 V14.3.0 (2017 Jun. 23). Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 9, for example, a wireless device is connected to a PCell in the licensed band and one or more SCells in the unlicensed band. In this application we denote a secondary cell in unlicensed spectrum as licensed-assisted access secondary cell (LAA SCell). In the case of standalone operation as in MulteFire, for example, no licensed cell is available for uplink control signal transmissions.

LAA HARQ Design

In the LAA study item Asynchronous HARQ is recommended for LAA UL physical uplink shared channel (PUSCH). That means UL retransmissions may not only occur one round trip time (RTT) (e.g. n+8) after the initial transmission, but rather at any point in time. This is considered beneficial in particular when retransmissions are blocked and postponed due to LBT. When introducing asynchronous HARQ, the wireless device should therefore assume that all transmitted UL HARQ processes were successful (set local status to acknowledged (ACK)). The wireless device performs a HARQ retransmission for a HARQ process only upon reception of a corresponding UL grant (new data indicator (NDI) not toggled) from the base station.

MulteFire HARQ Design

Downlink HARQ

After reception of the physical downlink control channel (PDCCH)/enhanced PDCCH (EPDCCH) and associated physical downlink shared channel (PDSCH) in subframe 'n', the wireless device may have the associated HARQ feedback ready for transmission in subframe 'n+4'. The wireless device may transmit any pending HARQ feedback at the earliest possible uplink transmission opportunity following the 'n+4' constraint. The uplink transmission opportunity is defined according to either MulteFire (MF)-sPUCCH or MF-ePUCCH resources being available for the wireless device. When transmitting the HARQ feedback associated to the PDSCH, the wireless device may collect pending feedback. The pending HARQ feedback may potentially include feedback for several downlink transmissions. The pending HARQ feedback may be collected in a bitmap with an implicit association between the index in the bitmap and the HARQ process identification (ID). The size of this bitmap is configurable by the base station. The maximum number of HARQ processes for DL operation is 16. When signaled in the MF-ePUCCH/sPUCCH bitmap, the default status of a HARQ-ID packet is NACK unless there is an ACK available to be sent.

Uplink HARQ

MF adopts asynchronous UL HARQ operation as introduced in LTE Rel-13 for enhanced machine type communications (eMTC). There is no support for non-adaptive HARQ operation, and the wireless device may ignore any information content on the PHICH resources with respect to HARQ operation. The PHICH resources are maintained as part of the downlink transmission resources, but the information content is reserved for future use. Any uplink transmission (new transmission or retransmission) is scheduled through UL grant through PDCCH/EPDCCH.

Unscheduled Uplink for LAA/MulteFire

For the LTE UL channel access, both wireless device and base station need to perform LBT operations corresponding to the scheduling request, scheduling grant and data transmission phases. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmission, and show superior performance in collocated deployment scenarios as seen in some simulation studies. Overall, study results show that Wi-Fi has a better uplink performance than LTE particularly in low-load or less congested network conditions. As the network congestion or load is increased, the LTE channel access mechanism (time division multiple access (TDMA) type) becomes more efficient, but Wi-Fi uplink performance is still superior.

Both MulteFire and 3GPP are discussing the support of unscheduled UL, also known as autonomous UL or grant-less UL, on unlicensed cells. For 3GPP, the autonomous UL functionality can be achieved by using the existing LTE Rel-14 SPS feature with some additional enhancements. This way, the wireless device can autonomously transmit the PUSCH without a dynamic UL grant and therefore UL latency can be lower by reducing the control signaling related to scheduling that precede every UL transmission. It has been shown that autonomous UL LAA performs significantly better than scheduled UL at low load due to the reduced signaling overhead. In addition, it coexists fairly with coexisting Wi-Fi network.

In scheduled mode, the UL access is controlled by the base station and is indicated to the wireless device via dynamic UL grant including time frequency resources, modulation and coding scheme (MCS), HARQ process ID, new data indicator (NDI), RV, etc. The wireless device then attempts to access the channel for the time for which the grant is valid and once LBT succeeds, the wireless device sends UL following the configuration indicated in UL grant. Then, the base station detects and decodes the uplink signal. However, the situation is not straight forward in unscheduled mode. In unscheduled mode, the base station does not know when to expect the UL transmission, as the wireless device autonomously sends the uplink transmission without a dynamic UL grant. Therefore, additional UL control signaling is required to avoid any ambiguity and support efficient autonomous UL operation.

MulteFire has agreed to introduce new uplink control information (UCI) (G-UCI) including following information:

HARQ processes;

Explicit C-RNTI wireless device identification (ID) is contained in the G-UCI;

NDI, RV is contained in the G-UCI;

Mean channel open time (MCOT) related information is contained in the G-UCI;

The base station determines whether to share or not,

Remaining MCOT up to 10 states, 1 bit flag to indicate the ending grant-less uplink (GUL) subframe, and For future study (FFS): other states to indicate the ending of GUL, then drop 1 bit flag;

MCS is not contained in G-UCI; and

No A-CSI (Channel State Information), HARQ ACK/NACK in the GUL PUSCH

The G-uplink control information (G-UCI) physical channel can reuse the MF1.0 rate matching for ACK/NACK and channel state information (CSI), and is transmitted in every GUL subframe and scrambled with cell specific pre-defined value.

Unscheduled UL HARQ Design

One issue when autonomous UL (AUL) based on SPS feature is supported is the UL HARQ design. When SPS is activated, the base station proactively sends NACK on PHICH for the SPS resource until UL data has been decoded. The SPS HARQ design is based on synchronous UL HARQ. The data reception and the feedback transmission have a fixed time relation of 4 subframes. This design might work if the feedback is sent on the primary licensed carrier that is always available. Nevertheless, with the intention of overbooking the resources on the LAA unlicensed carrier, it is not clear how PHICH collisions can be avoided. On the other hand, the same design is not applicable for unlicensed carrier: first, the PHICH is not available on LAA secondary cells; second, the process highly utilizes the unlicensed channel; and third, this kind of synchronous behaviour with fixed timing between data transmission and feedback reception cannot be deployed on the unlicensed channel due to uncertainty of channel availability.

Alternatively, when transmitting the HARQ feedback associated to the autonomous PUSCH, the base station may collect pending feedback. The pending HARQ feedback may potentially include feedback for several uplink transmissions. The pending HARQ feedback may be collected in a bitmap with an implicit association between the index in the bitmap and the HARQ process ID (for instance: 0 to indicate NACK, 1 to indicate ACK). The bitmap may also encompass the UL HARQ processes configured on multiple UL cells. A new downlink control information (DCI) (A-DCI) on ePDCCH is introduced to send the bit map.

In release 14 SPS, HARQ retransmissions can be configured with a fixed redundancy version, since it might have missed the first transmission and thus might not be able to decode a subsequent retransmission with an unexpected redundancy version.

SUMMARY

As stated above, providing only fixed redundancy for autonomous uplink HARQ procedures reduces the energy efficiency and reduces the available coding gains. Problems arise when considering solutions with incremental redundancy with respect to the additional control signaling assumed for autonomous uplink connections.

Some embodiments advantageously provide methods, network nodes and wireless devices for facilitating retransmission self-decoding even if a network node misses the initial transmission and/or if the wireless device is unaware of (i.e., does not know) whether the network node received the initial or previous transmission. Also, conveyance of the missed reception information to the network node to the extent possible considering the self-decodability constraint is provided. Thereby, the coding gains of incremental redundancy can be exploited when possible according to embodiments of the disclosure.

Disabling the incremental redundancy completely is not desired in LTE systems (e.g., LTE, New Radio (NR), MulteFire) because this feature can provide significant performance improvements. By disabling this incremental redundancy completely, LTE systems may lose additional coding gains.

Besides, incremental redundancy is one of the main features that can distinguish LTE from other technologies that do not support such advanced HARQ design (e.g., Wi-Fi). By enabling incremental redundancy, LTE systems may be able to provide this advantage, even in the unlicensed spectrum.

The missed (or unknown) reception information can be very useful to the network node to manage autonomous UL access. For example, if the network node observes many missed (or unknown) reception events, the network node can reduce the number of autonomous UL wireless devices or even disable autonomous UL access entirely.

Embodiments described here are not limited to LAA autonomous UL. It may also be applicable to any scenario where the wireless device is in control of RV selection:

MulteFire grant-less UL;

SPS on P/Scell operating on licensed or unlicensed carrier; and

NR, and more specifically grant-less/SPS UL operation.

Some embodiments provide the following non-limiting advantages:

Performance improvement due to additional coding gains provided by the incremental redundancy; and Maintaining LTE superior performance as compared to other technologies that do not support advanced HARQ mechanisms.

According to one aspect, a method is performed by a wireless device for transmission comprising redundancy in a hybrid automatic repeat request, HARQ, process. The method includes determining, by a wireless device, a redundancy version, RV, for transmission by the wireless device, the RV being based at least on a coding rate. The method further comprises performing a transmission by the wireless device, wherein the transmission is according to the determined redundancy version.

According to this aspect, in some embodiments, the determining the RV for the transmission by the wireless device further includes selecting the RV from a plurality of RVs based at least on the coding rate. In some embodiments of this aspect, the plurality of RV includes at least four RVs, each of the at least four RVs corresponding to a different starting position in a circularly-readable coded bit buffer. In some embodiments of this aspect, the determining the RV for the transmission by the wireless device further comprises determining that the coding rate corresponds to a self-decodable transmission for the RV. In some embodiments of this aspect, the self-decodable transmission includes a predetermined number of systematic bits. In some embodiments of this aspect, the self-decodable transmission includes all of the systematic bits in a circularly-readable coded bit buffer, the circularly-readable coded bit buffer including a number of systematic bits and a number of parity bits. In some embodiments of this aspect, the transmission by the wireless device is a retransmission by the wireless device, the retransmission associated with a HARQ process. In some embodiments of this aspect, the transmission by the wireless device is an autonomous uplink, UL, retransmission by the wireless device. In some embodiments of this aspect, the method further includes determining that the wireless device received an ACK/NACK message for a previous transmission from a network node serving the wireless device. In some embodiments of this aspect, the determining the RV for the transmission by the wireless device is performed based on the wireless device receiving the ACK/NACK message for the previous transmission. In some embodiments of this aspect, the determining the RV for the transmission by the wireless device is a result of at least a determination that the wireless device did not receive an ACK/NACK message for a previous transmission from a network node serving the wireless device. In some embodiments of this aspect, the method further includes determining the coding rate; and comparing the determined coding rate to at least a first threshold to determine the RV. In some embodiments of this aspect, the determining the coding rate further comprises identifying the coding rate in a table, the coding rate corresponding to the received MCS index and at least one starting position of a circularly-readable coded bit buffer. In some embodiments of this aspect, the first threshold is based on a function of a number of parity bit columns and a number of systematic bit columns in a readable coded bit buffer. In some embodiments of this aspect, the comparing the determined coding rate to the at least the first threshold further comprises when the coding rate exceeds the first threshold, the determined RV for the transmission is RV #0. In some embodiments of this aspect, the comparing the determined coding rate to the at least the first threshold further comprises when the coding rate at most meets the first threshold, the determined RV for the transmission is RV #3. In some embodiments of this aspect, the comparing the determined coding rate to the at least the first threshold further comprises when the coding rate at most meets the first threshold and exceeds a second threshold, the determined RV for the transmission is RV #3, the second threshold being lower than the first threshold. In some embodiments of this aspect, when the coding rate at most meets the second threshold and exceeds a third threshold, the determined RV for the transmission is RV #2, the third threshold being lower than the second threshold. In some embodiments of this aspect, when the coding rate falls at most meets the third threshold, the determined RV for the transmission is any one of RV #0, RV #1, RV #2, and RV #3. In some embodiments of this aspect, the determining the coding rate further comprises determining the coding rate for a previous transmission by the wireless device. In some embodiments of this aspect, when the previous transmission is with RV #3, if the coding rate exceeds the first threshold, the determined RV is for a retransmission with RV #3, otherwise the determined RV is for a retransmission with RV #0. In some embodiments of this aspect, when the previous transmission is with RV #2, the determined RV is for a retransmission with one of RV #0 and RV #3. In some embodiments of this aspect, when the previous transmission is with RV #1, the determined RV is for a retransmission with one of RV #0, RV #2, and RV #3. In some embodiments of this aspect, the method further includes receiving a lookup table from a network node; and the determining the RV for the transmission further comprises at least selecting, by the wireless device, the RV from the lookup table. In some embodiments of this aspect, the method further includes receiving a modulation and coding scheme, MCS, index from the network node; and selecting the RV from the lookup table further comprises selecting the RV corresponding to at least the MCS index in the lookup table.

According to another aspect of the disclosure, a wireless device is provided for transmission comprising redundancy in a hybrid automatic repeat request, HARQ, process. The wireless device comprises processing circuitry and the processing circuitry is configured to determine, by the wireless device, a redundancy version, RV, for transmission by the wireless device, the RV being based at least on a coding rate. The wireless device further comprises a transceiver configured to perform a transmission wherein the transmission is according to the determined redundancy version.

According to this aspect, in some embodiments, the processing circuitry is further configured to determine the RV for the transmission by being further configured to select the RV from a plurality of RVs based at least on the coding rate. In some embodiments of this aspect, the plurality of RV includes at least four RVs, each of the at least four RVs corresponding to a different starting position in a circularly-readable coded bit buffer. In some embodiments of this aspect, the processing circuitry is further configured to determine the RV for the transmission by being further configured to determine that the coding rate corresponds to a self-decodable transmission for the RV. In some embodiments of this aspect, the self-decodable transmission includes a predetermined number of systematic bits. In some embodiments of this aspect, the self-decodable transmission includes all of the systematic bits in a circularly-readable coded bit buffer, the circularly-readable coded bit buffer including a number of systematic bits and a number of parity bits. In some embodiments of this aspect, the transmission by the wireless device is a retransmission by the wireless device, the retransmission associated with a HARQ process. In some embodiments of this aspect, the transmission by the wireless device is an autonomous uplink, UL, retransmission by the wireless device. In some embodiments of this aspect, the processing circuitry is further configured to determine that the wireless device received an ACK/NACK message for a previous transmission from a network node serving the wireless device. In some embodiments of this aspect, the processing circuitry is further configured to determine the RV for the transmission based on the wireless device receiving the ACK/NACK message for the previous transmission. In some embodiments of this aspect, the determination of the RV for the transmission by the wireless device is a result of at least a determination that the wireless device did not receive an ACK/NACK message for a previous transmission from a network node serving the wireless device. In some embodiments of this aspect, the processing circuitry is further configured to determine the coding rate; and compare the determined coding rate to at least a first threshold to determine the RV. In some embodiments of this aspect, the processing circuitry is further configured to determine the coding rate by being further configured to identify the coding rate in a table, the coding rate corresponding to the received MCS index and at least one starting position of a circularly-readable coded bit buffer. In some embodiments of this aspect, the first threshold is based on a function of a number of parity bit columns and a number of systematic bit columns in a readable coded bit buffer. In some embodiments of this aspect, the processing circuitry is further configured to compare the determined coding rate to the at least the first threshold by being further configured to, when the coding rate exceeds the first threshold, determine that the RV for the transmission is RV #0. In some embodiments of this aspect, the processing circuitry is further configured to compare the determined coding rate to the at least the first threshold by being further configured to, when the coding rate at most meets the first threshold, determine that the RV for the transmission is RV #3. In some embodiments of this aspect, the processing circuitry is configured to compare the determined coding rate to the at least the first threshold by being further configured to, when the coding rate at most meets the first threshold and exceeds a second threshold, determine that the RV for the transmission is RV #3, the second threshold being lower than the first threshold. In some embodiments of this aspect, the processing circuitry is further configured to, when the coding rate at most meets the second threshold and exceeds a third threshold, determine that the RV for the transmission is RV #2, the third threshold being lower than the second threshold. In some embodiments of this aspect, the processing circuitry is further configured to, when the coding rate falls at most meets the third threshold, determine that the RV for the transmission is any one of RV #0, RV #1, RV #2, and RV #3. In some embodiments of this aspect, the processing circuitry is further configured to determine the coding rate by being further configured to determine the coding rate for a previous transmission by the wireless device. In some embodiments of this aspect, the processing circuitry is further configured to, when the previous transmission is with RV #3, if the coding rate exceeds the first threshold, determine that the RV is for a retransmission with RV #3, otherwise the determined RV is for a retransmission with RV #0. In some embodiments of this aspect, the processing circuitry is further configured to, when the previous transmission is with RV #2, determine that the RV is for a retransmission with one of RV #0 and RV #3. In some embodiments of this aspect, the processing circuitry is further configured to, when the previous transmission is with RV #1, determine that the RV is for a retransmission with one of RV #0, RV #2, and RV #3. In some embodiments of this aspect, the processing circuitry is further configured to receive a lookup table from a network node; and determine the RV for the transmission by being further configured to select the RV from the lookup table. In some embodiments of this aspect, the processing circuitry is further configured to receive a modulation and coding scheme, MCS, index from the network node; and select the RV from the lookup table by being further configured to select the RV corresponding to at least the MCS index in the lookup table.

According to yet another aspect, a method is provided in a network node for performing a hybrid automatic repeat request, HARQ, process. The method includes receiving, from a wireless device, a transmission corresponding to a redundancy version, RV, the RV being based at least on a coding rate.

According to this aspect, in some embodiments, the method further includes communicating, to the wireless device, at least one identity of the RV based at least on the coding rate. In some embodiments of this aspect, the communicating the at least one identity of the RV further comprises communicating a lookup table to the wireless device, the lookup table including a plurality of RVs, each of the plurality of RVs associated with at least one of a plurality of modulating and coding scheme, MCS, indices. In some embodiments of this aspect, the method further includes communicating, to the wireless device, an MCS index for a transmission by the wireless device; and the RV corresponding to the received transmission is selected from the plurality of RVs in the lookup table based at least on the received MCS index for the transmission. In some embodiments of this aspect, the method further includes communicating at least a first threshold coding rate to the wireless device, the RV being further based on a comparison of the coding rate and the at least the first threshold. In some embodiments of this aspect, the communication of the at least the first threshold coding rate is via radio resource control, RRC, signaling. In some embodiments of this aspect, the communication of the at least the first threshold coding rate to the wireless device further comprises communicating at least the first threshold coding rate, a second threshold coding rate, and a third threshold coding rate. In some embodiments of this aspect, the second threshold coding rate is less than the first threshold coding rate and the third threshold coding rate is less than the second threshold code rate.

According to yet another aspect, a network node configured to perform a hybrid automatic repeat request, HARQ, process is provided. The network node comprises processing circuitry, the processing circuitry being configured to receive, from a wireless device, a transmission corresponding to a redundancy version, RV, the RV being based at least on a coding rate.

According to this aspect, in some embodiments, the processing circuitry is further configured to communicate, to the wireless device, at least one identity of the RV based at least on the coding rate. In some embodiments of this aspect, the processing circuitry is further configured to communicate the at least one identity of the RV by being further configured to at least communicate a lookup table to the wireless device, the lookup table including a plurality of RVs, each of the plurality of RVs associated with at least one of a plurality of modulating and coding scheme, MCS, indices. In some embodiments of this aspect, the processing circuitry is further configured to communicate, to the wireless device, an MCS index for a transmission by the wireless device; and the RV corresponding to the received transmission is selected from the plurality of RVs in the lookup table based at least on the received MCS index for the transmission. In some embodiments of this aspect, the processing circuitry is further configured to communicate at least a first threshold coding rate to the wireless device, the RV being further based on a comparison of the coding rate and the at least the first threshold. In some embodiments of this aspect, the processing circuitry is further configured to communicate the at least the first threshold coding rate via radio resource control, RRC, signaling. In some embodiments of this aspect, the processing circuitry is further configured to communicate the at least the first threshold coding rate to the wireless device by being further configured to communicate at least the first threshold coding rate, a second threshold coding rate, and a third threshold coding rate. In some embodiments of this aspect, the second threshold coding rate is less than the first threshold coding rate and the third threshold coding rate is less than the second threshold code rate.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is an illustration of uplink semi-persistent scheduling;

FIG. 9 is an illustration of LAA to unlicensed spectrum using LTE carrier aggregation;

DETAILED DESCRIPTION

Figure 1:
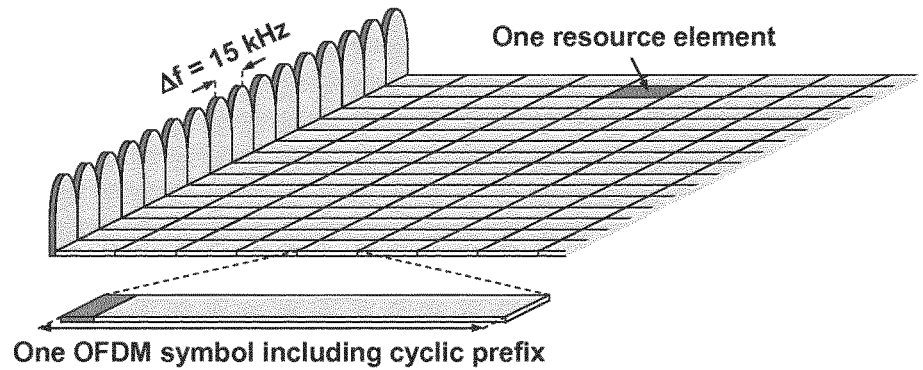
FIG. 1 is a diagram of an LTE downlink physical resource.
Figure 2:
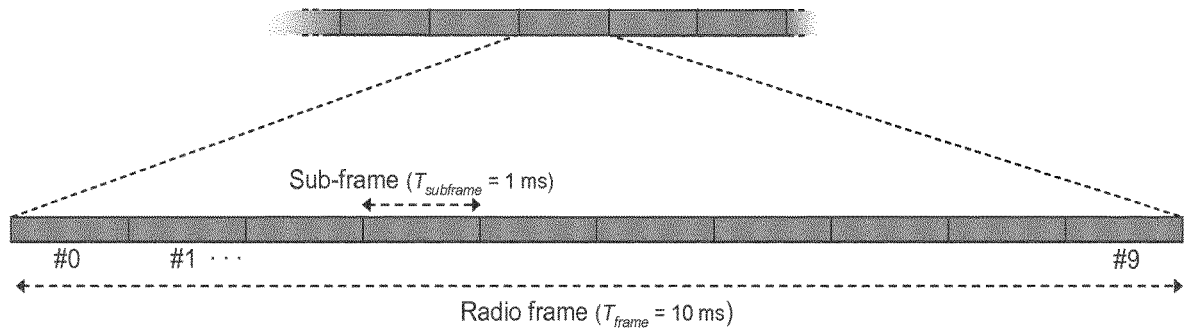
FIG. 2 is a diagram of an LTE time-domain structure.
Figure 3:
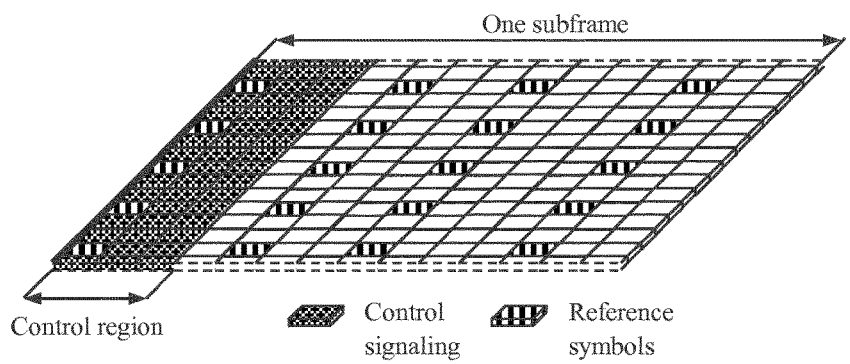
FIG. 3 is a diagram of a downlink subframe.
Figure 4:
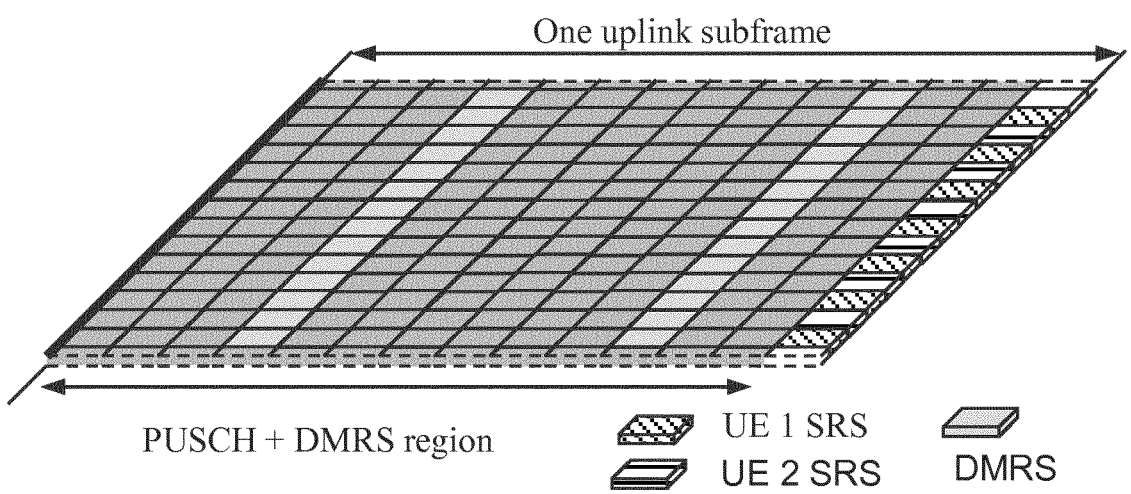
FIG. 4 is a diagram of an uplink subframe.
Figure 5:
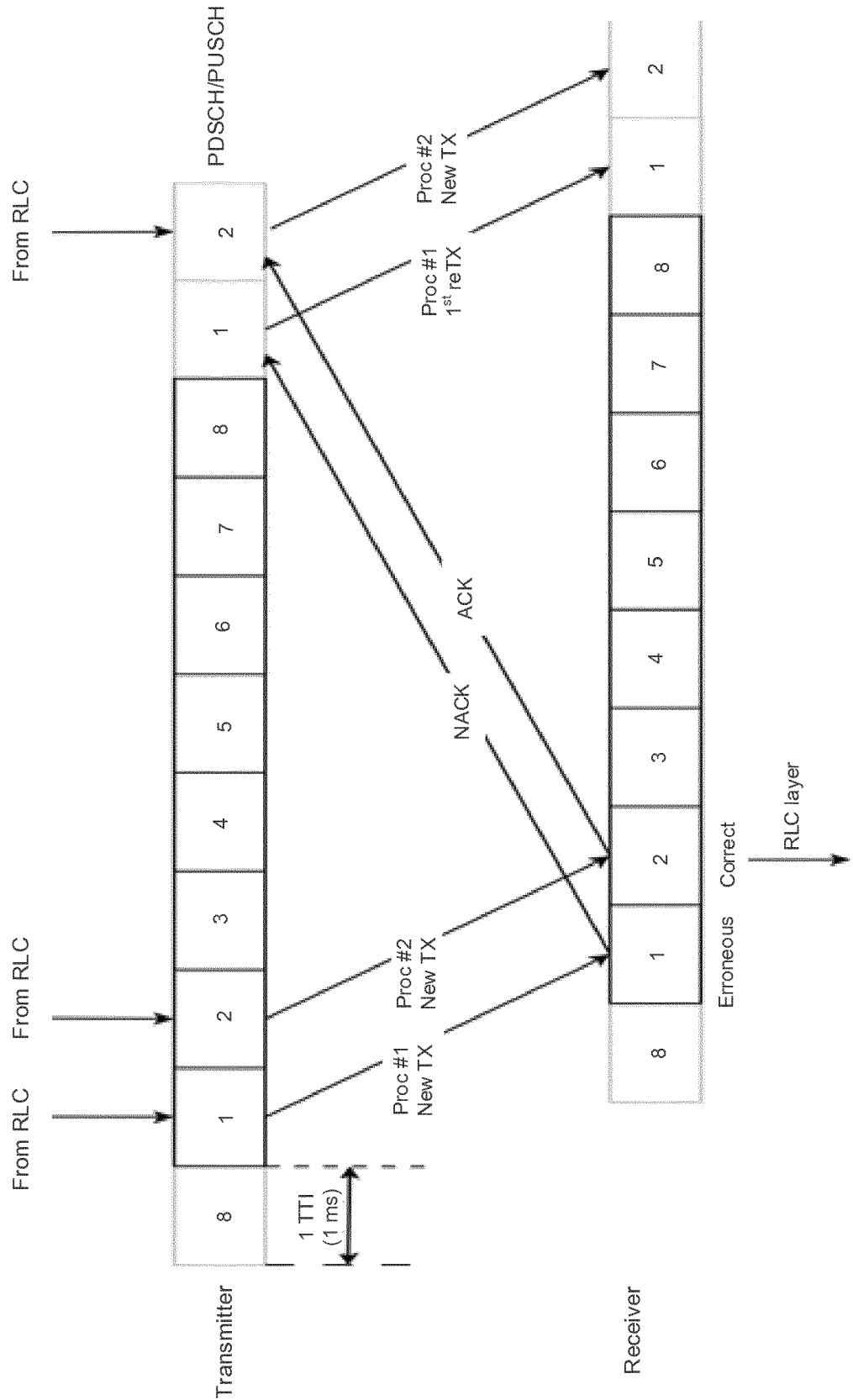
FIG. 5 is a diagram of HARQ operations in LTE.

Before describing in detail exemplary embodiments, it is noted that the embodiments reside primarily in combinations of apparatus components and processing steps related to redundancy version selection for autonomous/grant-less uplink transmissions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 10:
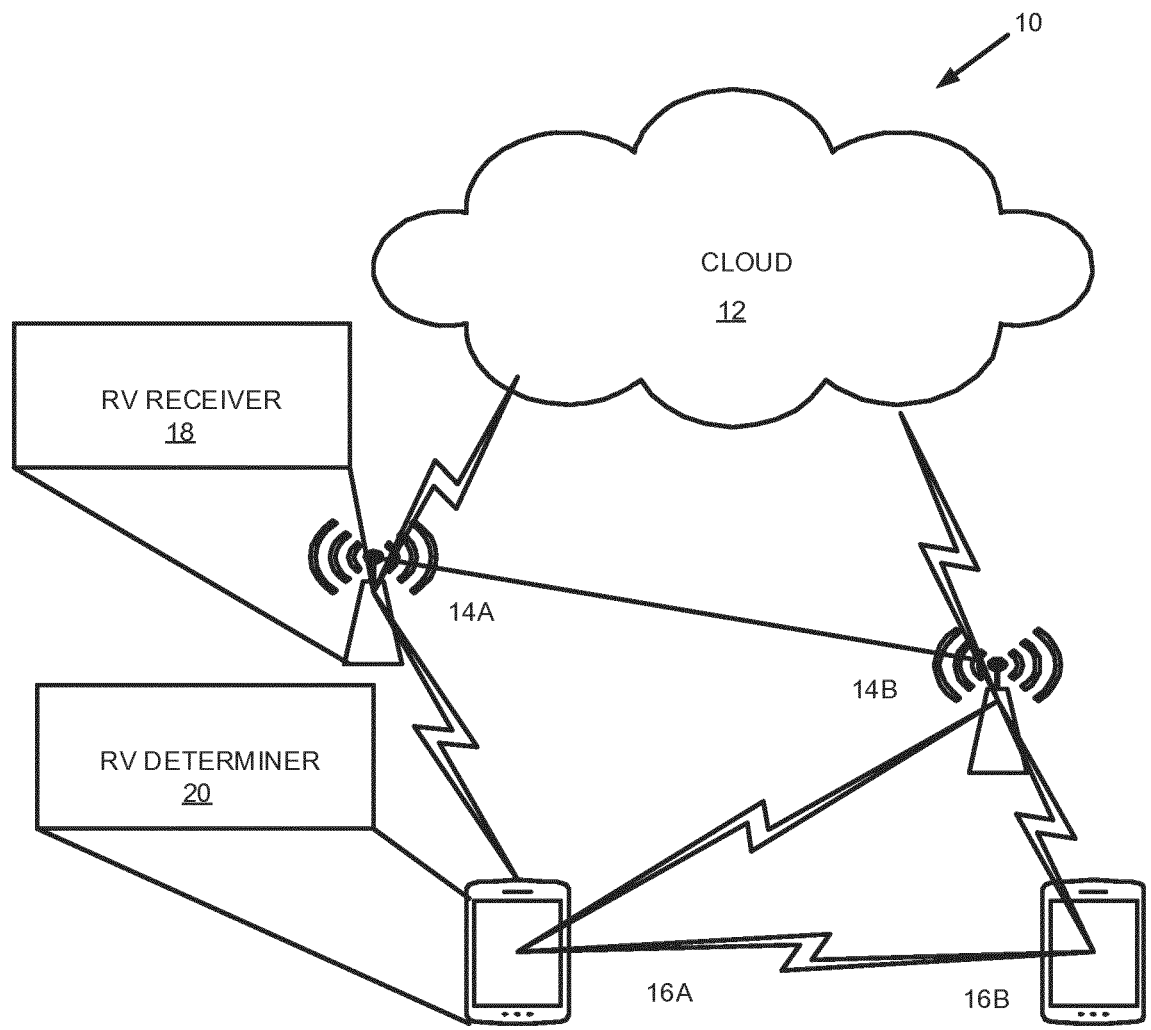
FIG. 10 is a block diagram of a wireless communication system constructed in accordance with principles set forth herein.

As stated above, providing only fixed redundancy for autonomous uplink HARQ procedures reduces the energy efficiency and reduces the available coding gains. Problems arise when considering solutions with incremental redundancy with respect to the additional control signaling assumed for autonomous uplink connections. Solutions are described herein to provide incremental redundancy for autonomous uplink. Embodiments provide methods, network nodes and wireless devices for facilitating retransmission self-decoding even if a network node misses the initial transmission and/or if the wireless device is unaware of (i.e., does not know) whether the network node received the initial or previous transmission. Also, conveyance of the missed reception information to the network node to the extent possible considering the self-decodability constraint is provided. Advantages of such embodiments are coding gains of incremental redundancy can be exploited which provides higher transmission rates and potentially reduced retransmissions. Improved latency, resource utilization and higher energy efficiency are other benefits. Returning to the drawing figures, in which like elements are referred to by like reference numerals, there is shown in FIG. 10 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes such as network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, wireless devices 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As shown in FIG. 10, the network node 14 includes a redundancy version (RV) receiver 18 configured to receive a transmission corresponding to a redundancy version (RV) from the wireless device 16, wherein the RV being based at least on a coding rate. In some embodiments, the RV is selected based on a comparison of the coding rate to a first threshold.

The wireless device 16 includes a redundancy version determiner 20 configured to determine a redundancy version, RV, for transmission by the wireless device 16, the RV being based at least one a coding rate. In some embodiments, the RV is selected based on a comparison of the coding rate to a first threshold.

Figure 11:
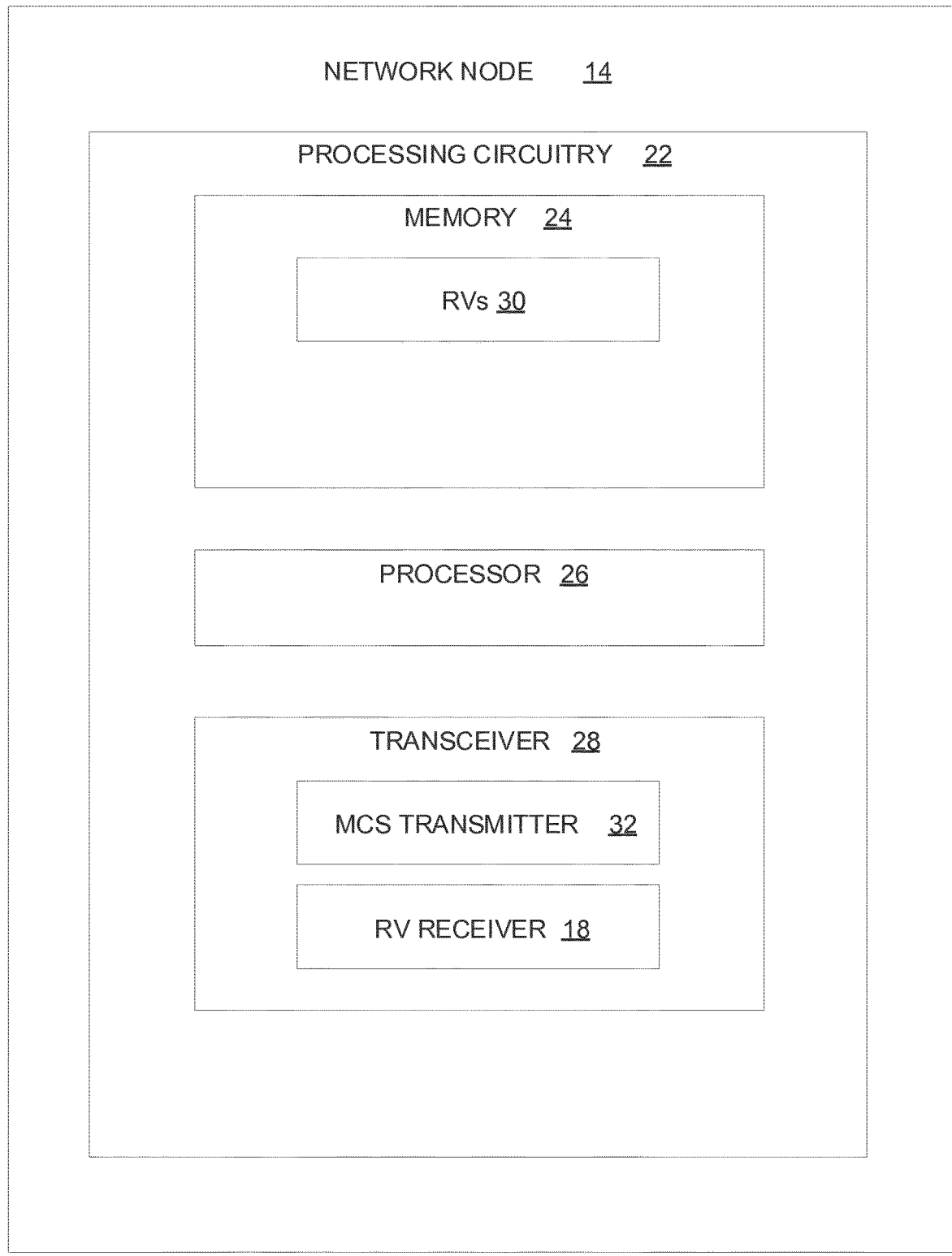
FIG. 11 is block diagram of a network node constructed in accordance with principles set forth herein.

FIG. 11 is a block diagram of a network node 14 configured to perform a hybrid automatic repeat request, HARQ, process. The network node 14 includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The network node 14 includes a transceiver 28. The memory 24 is configured to store redundancy versions (RVs) 30. The processor 26 is configured to execute software to determine MCS indices that are transmitted by the MCS transmitter 32 of the transceiver 28. The MCS indices transmitted to the wireless device 16 enable the wireless device 16 to calculate a coding rate. The transceiver 28 also includes an RV receiver 18 configured to receive, from the wireless device 16, a transmission corresponding to a redundancy version (RV), the RV being based at least on the coding rate. In some embodiments, the RV is selected based on a comparison of the coding rate to a first threshold.

In some embodiments, the RV receiver 18 and/or the processing circuitry 22 is configured to perform the methods and techniques described herein as performed by the network node 14, such as the processes described with reference to FIG. 15.

Figure 12:
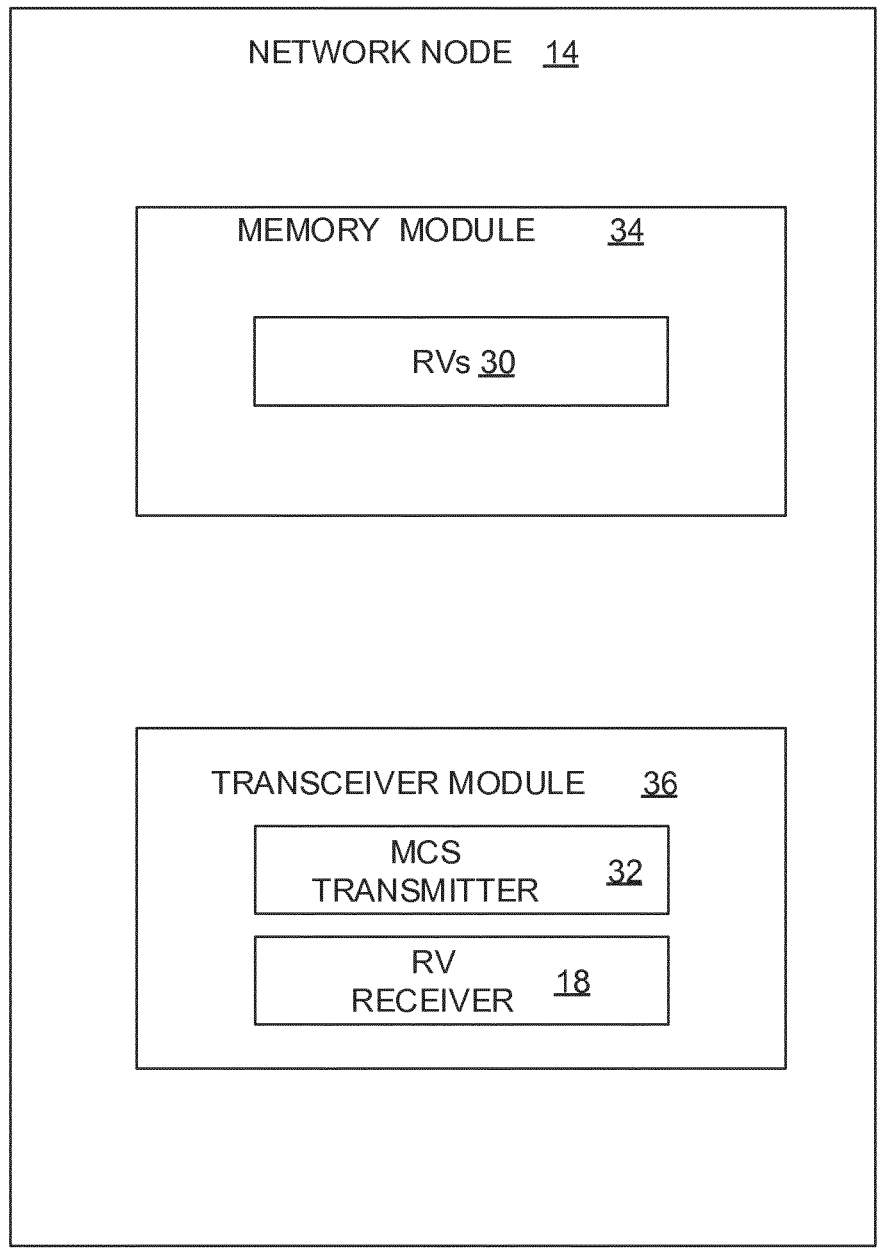
FIG. 12 is a block diagram of an alternative embodiment of the network node.

FIG. 12 is an alternative embodiment of a network node 14 that includes modules that may contain software executable by a processor. A memory module 34 is configured to store RVs 30. The transceiver module 36 may be implemented in part by software and includes an MCS transmitter 32 and an RV receiver 18.

Figure 13:
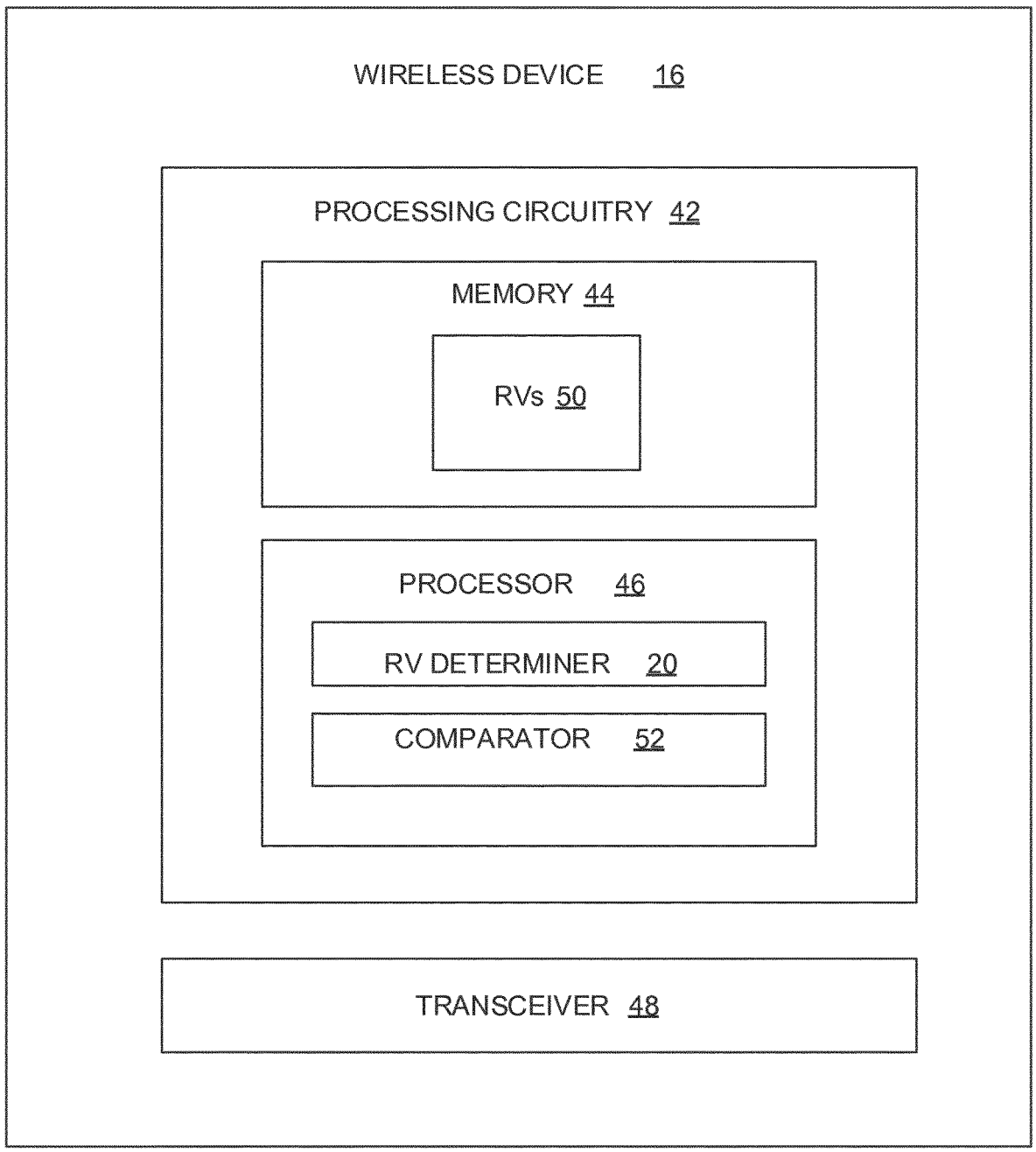
FIG. 13 is a block diagram of a wireless device constructed in accordance with principles set forth herein.

FIG. 13 is a block diagram of an embodiment of a wireless device 16 configured for retransmission of redundancy versions in a hybrid automatic repeat request, HARQ, process.

The wireless device 16 includes processing circuitry 42. In some embodiments, the processing circuitry 42 may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The wireless device 16 includes transceiver 48. The memory 44 is configured to store redundancy versions (RVs) 50. The processor 46 is configured to implement an RV determiner 20 and a comparator 52. The comparator 52 is configured to compare a coding rate to a first threshold. The RV determiner 20 is configured to determine a redundancy version, RV, for transmission by the wireless device 16, the RV being based at least on the coding rate, and in some embodiments, based on the comparison. The transceiver 48 is configured to receive MCS indices from a network node 14. The transceiver 48 is configured to perform a transmission according to the determined RV to the network node 14.

In some embodiments, the RV determiner 20 and/or the processing circuitry 42 is configured to perform the methods and techniques described herein as performed by the wireless device 16, such as the processes described with reference to FIG. 16.

Figure 14:
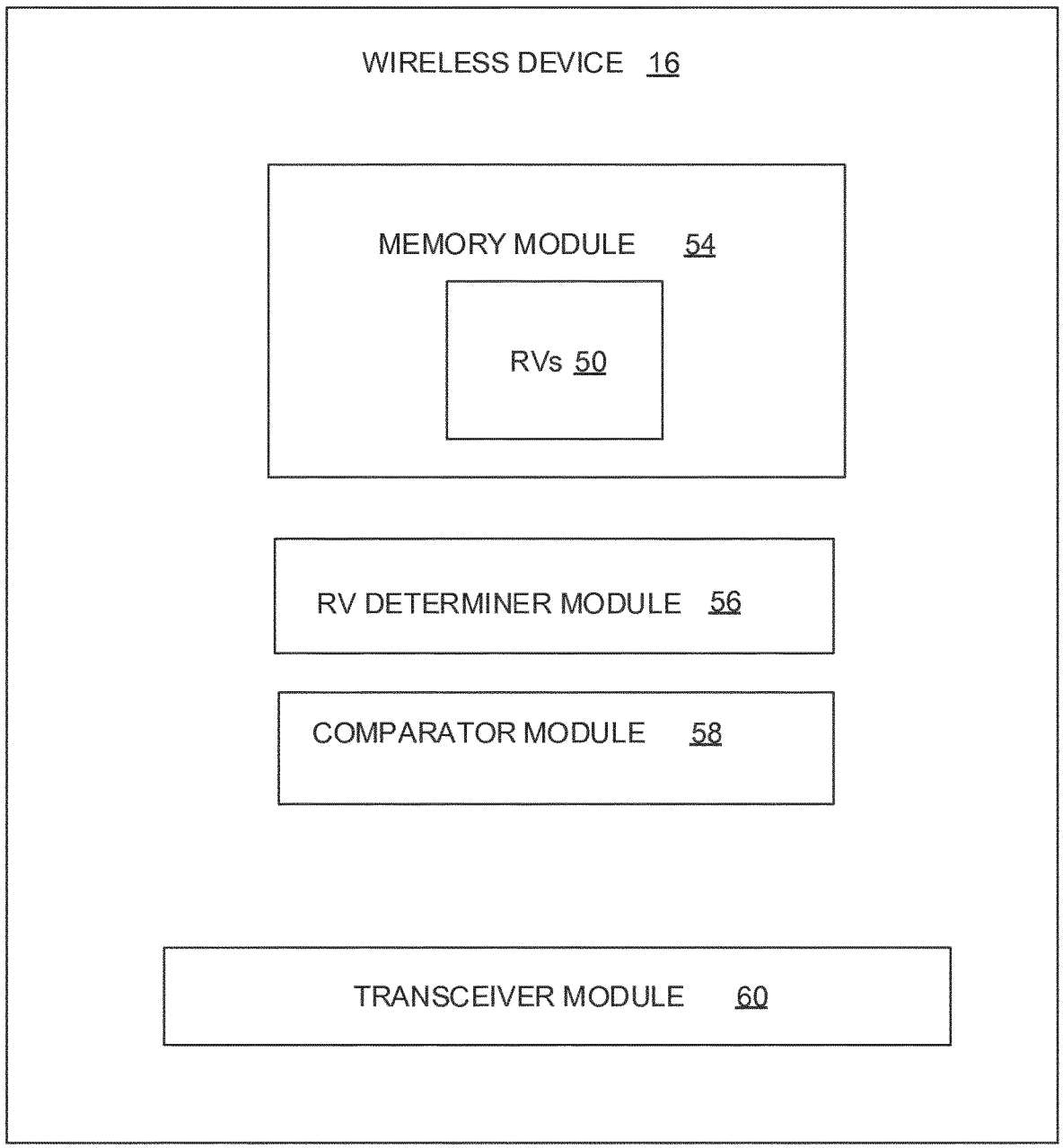
FIG. 14 is a block diagram of an alternative embodiment of the wireless device.

FIG. 14 is an alternative embodiment of the wireless device 16 that includes modules that may contain software executable by a processor. A memory module 54 stores RVs 50. An RV determiner module 56 and a comparator module 58. The comparator module 58 is configured to cause a processor to compare a coding rate to a first threshold. The RV determiner module 56 is configured to cause a processor to determine a redundancy version, RV, for transmission by the wireless device 16 based at least on a coding rate, and, in some embodiments, based on the comparison. The transceiver module 60 is configured to receive MCS indices from the network node 14 and transmit according to determined RVs to the network node 14. The transceiver module 60 is configured to perform a transmission according to the determined RV.

Figure 15:
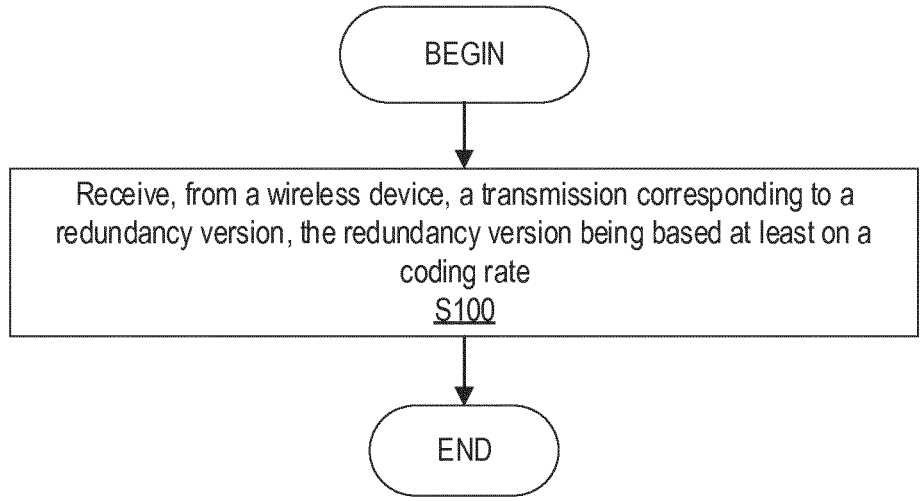
FIG. 15 is a flowchart of an exemplary process in a network node for performing a hybrid automatic repeat request, HARQ, process.

FIG. 15 is a flowchart of an exemplary process in a network node 14 for performing a hybrid automatic repeat request, HARQ, process. The process includes receiving (block S100), from the wireless device 16, via e.g., RV receiver 18, a transmission corresponding to a redundancy version, the redundancy version being at least on a coding rate.

In some embodiments, the process includes communicating, via e.g., transceiver 28, to the wireless device 16, at least one identity of the RV based at least on the coding rate. In some embodiments, the communicating the at least one identity of the RV further includes communicating a lookup table to the wireless device 16, the lookup table including a plurality of RVs, each of the plurality of RVs associated with at least one of a plurality of modulating and coding scheme, MCS, indices. In some embodiments, the process further includes communicating, to the wireless device, via e.g., transceiver 28, an MCS index for a transmission by the wireless device 16; and the RV corresponding to the received transmission is selected from the plurality of RVs in the lookup table based at least on the received MCS index for the transmission. In some embodiments, the method further includes communicating, via e.g., transceiver 28, at least a first threshold coding rate to the wireless device 16, the RV being further based on a comparison of the coding rate and the at least the first threshold. In some embodiments, the communication of the at least the first threshold coding rate is via radio resource control, RRC, signaling. In some embodiments, the communication of the at least the first threshold coding rate to the wireless device 16 further comprises communicating at least the first threshold coding rate, a second threshold coding rate, and a third threshold coding rate. In some embodiments, the second threshold coding rate is less than the first threshold coding rate and the third threshold coding rate is less than the second threshold code rate.

In some embodiments, the process includes transmitting, via a transceiver 28, to a wireless device 16 a modulation and coding scheme, MCS, index to enable the wireless device 16 to calculate a coding rate. The process may also include receiving, via the transceiver 28, a redundancy version (RV) from the wireless device 16, the RV being selected based on a comparison of the coding rate to a first threshold.

Figure 16:
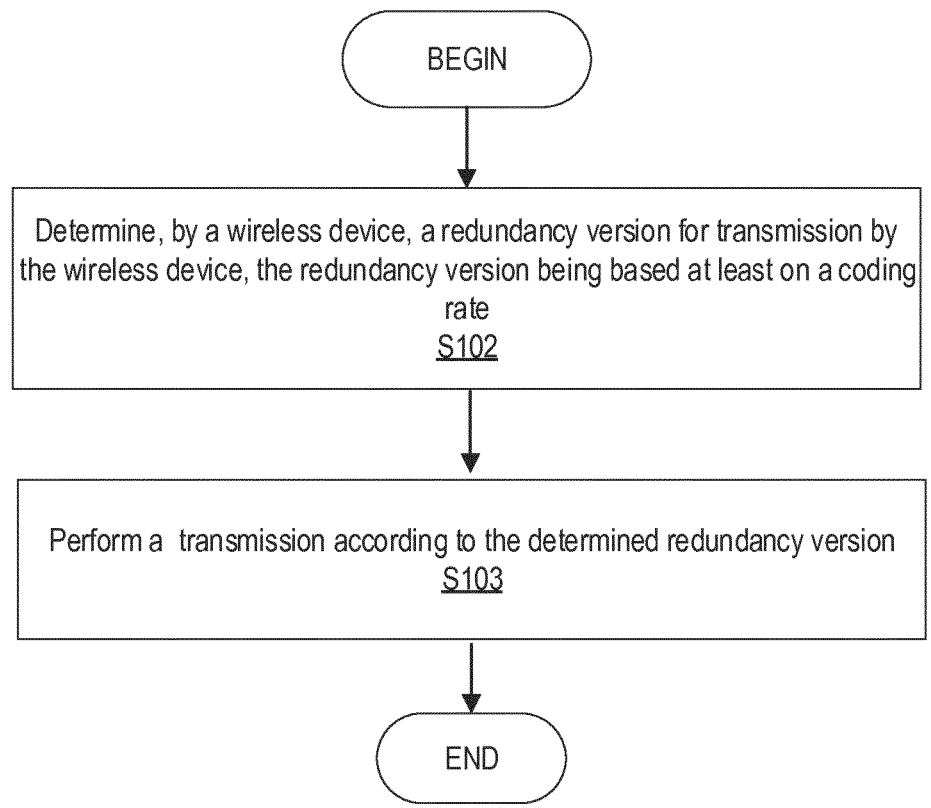
FIG. 16 is a flowchart of an exemplary process in a wireless device for retransmission of redundancy versions in a hybrid automatic repeat request, HARQ, process.

FIG. 16 is a flowchart of an exemplary process in a wireless device 16 for transmissions and retransmission of redundancy versions in a hybrid automatic repeat request, HARQ, process. The process includes determining (Block S102), by a wireless device 16, via e.g., the processing circuitry 42 and/or RV determiner 20, a redundancy version, RV, for transmission by the wireless device 16, the RV being based at least on a coding rate. The process further includes performing a transmission (Block S103), by the wireless device, wherein the transmission is according to the determined redundancy version.

Figure 6:
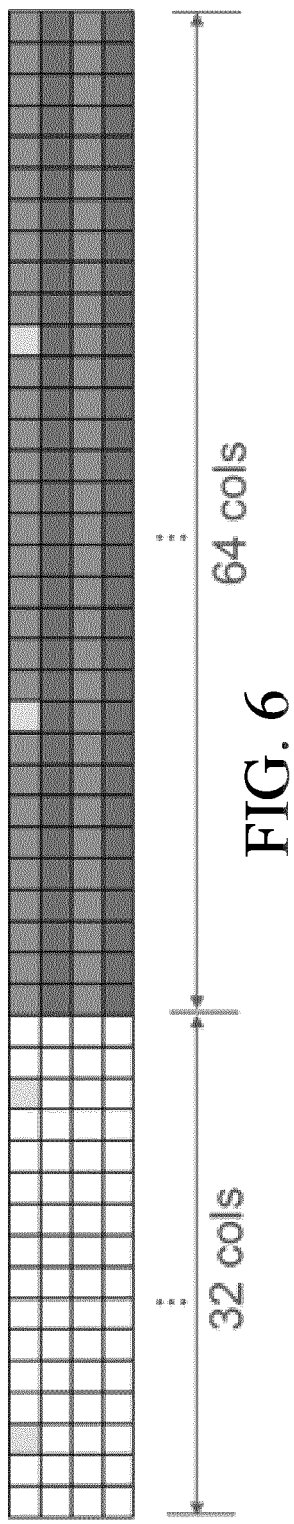
FIG. 6 is a diagram of an LTE circular buffer model for single-spatial layer transmission.
Figure 7:
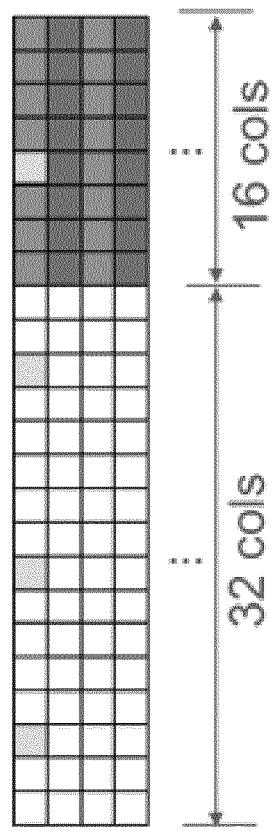
FIG. 7 is a diagram of an LTE circular buffer model for multi-spatial layer transmission.

In some embodiments, the determining the RV for the transmission by the wireless device 16 further comprises selecting the RV from a plurality of RVs based at least on the coding rate. In some embodiments, the plurality of RV includes at least four RVs, each of the at least four RVs corresponding to a different starting position in a circularly-readable coded bit buffer. A circularly-readable coded bit buffer corresponds to the circular buffer model as described above and illustrated in FIGS. 6, and 7, as examples. In some embodiments, the determining the RV for the transmission by the wireless device 16 further comprises determining that the coding rate corresponds to a self-decodable transmission for the RV. In some embodiments, the self-decodable transmission includes a predetermined number of systematic bits. In some embodiments, the self-decodable transmission includes all of the systematic bits in a circularly-readable coded bit buffer, the circularly-readable coded bit buffer including a number of systematic bits and a number of parity bits. In some embodiments, the transmission by the wireless device 16, via e.g., transceiver 48, is a retransmission by the wireless device 16, the retransmission associated with a HARQ process. In some embodiments, the transmission by the wireless device 16 is an autonomous uplink, UL, retransmission by the wireless device 16, via e.g., transceiver 48. In some embodiments, the method further includes determining that the wireless device 16 received an ACK/NACK message for a previous transmission from a network node 14 serving the wireless device 16. In some embodiments, the determining the RV for the transmission by the wireless device 16 is performed based on the wireless device 16 receiving the ACK/NACK message for the previous transmission. In some embodiments, the determining the RV for the transmission by the wireless device 16 is a result of at least a determination that the wireless device 16 did not receive an ACK/NACK message for a previous transmission from a network node 14 serving the wireless device 16. In some embodiments, the method further includes determining the coding rate; and comparing the determined coding rate to at least a first threshold to determine the RV. In some embodiments, determining the coding rate further comprises identifying the coding rate in a table, the coding rate corresponding to the received MCS index and at least one starting position of a circularly-readable coded bit buffer. In some embodiments, the first threshold is based on a function of a number of parity bit columns and a number of systematic bit columns in a readable coded bit buffer. In some embodiments, the comparing the determined coding rate to the at least the first threshold further comprises, when the coding rate exceeds the first threshold, the determined RV for the transmission is RV #0. In some embodiments, the comparing the determined coding rate to the at least the first threshold further comprises, when the coding rate at most meets the first threshold, the determined RV for the transmission is RV #3. In some embodiments, the comparing the determined coding rate to the at least the first threshold further comprises, when the coding rate at most meets the first threshold and exceeds a second threshold, the determined RV for the transmission is RV #3, the second threshold being lower than the first threshold. In some embodiments, when the coding rate at most meets the second threshold and exceeds a third threshold, the determined RV for the transmission is RV #2, the third threshold being lower than the second threshold. In some embodiments, when the coding rate falls at most meets the third threshold, the determined RV for the transmission is any one of RV #0, RV #1, RV #2, and RV #3. In some embodiments, determining the coding rate further comprises determining the coding rate for a previous transmission by the wireless device 16. In some embodiments, when the previous transmission is with RV #3, if the coding rate exceeds the first threshold, the determined RV is for a retransmission with RV #3, otherwise the determined RV is for a retransmission with RV #0. In some embodiments, when the previous transmission is with RV #2, the determined RV is for a retransmission with one of RV #0 and RV #3. In some embodiments, when the previous transmission is with RV #1, the determined RV is for a retransmission with one of RV #0, RV #2, and RV #3. In some embodiments, the method further includes receiving, via e.g., transceiver 48, a lookup table from a network node 14; and the determining the RV for the transmission further comprises at least selecting, by the wireless device 16, the RV from the lookup table. In some embodiments, the method further includes receiving a modulation and coding scheme, MCS, index from the network node 14; and selecting the RV from the lookup table further comprises selecting, via e.g., the processing circuitry 42 and/or the RV determiner 20, the RV corresponding to at least the MCS index in the lookup table.

In some embodiments, the process includes comparing, via the comparator 52, a coding rate to a first threshold. The process may include determining, via the RV determiner 20, a redundancy version, RV, for transmission by the wireless device 16 based on the comparison.

LTE rate matching may be based on circular reading from a coded bit buffer, which may be rectangular with, for example, 96 columns for the case of UL-Shared Channel (SCH). In the example, the first 32 columns are systematic bits and the next 64 columns are parity bits. The four redundancy versions (RVs) correspond to four starting points of reading from the buffer: starting from col #2, #26, #50 and #74 respectively. Since cols #0 and #1 are not included in RV #0, some systematic bits are punctured.

It should be understood that, in other embodiments, the circular buffer may have other configurations, such as, for example, more or less columns and/or more or less systematic and parity bits than in the example(s) used herein.

In LTE, the initial transmission uses RV #0. RV #0 contains 30 out of 32 columns of systematic bits and therefore it is self-decodable, which means that if RV #0 is received with sufficient signal to interference plus noise ratio (SINR), the receiver can decode and recover the coded data without further retransmissions.

The situation is different for RV #1, #2, and #3. RV #1, #2, and #3 might include few or none of the systematic bits. Without enough systematic bits, the receiver (e.g., network node 14) cannot recover the coded data.

However, since the buffer is circular, even if the RV starts later than the 31st column (end of the systematic bits); there is still a chance that the transmission includes systematic bits. For example, for a transmission with RV #3, the transmitter (e.g., wireless device 16) reads the bits starting from the start column #74 until the necessary amount of bits are obtained. If the reading reaches the end of the buffer and still more bits are needed, the reading of bits then resumes from the beginning of the buffer, i.e. column #0.

Accordingly, if any RV contains as many systematic bits as RV #0, it is possible to recover the coded data at the receiver even if RV #0 is not received. Taking RV #3 as an example, RV #3 will include 22 parity bit columns (from col #74 to #95) before resuming again from systematic column #0. To get the same performance as RV #0, 30 columns of systematic bits need to be added to these parity bits for RV #3. RV #3 will eventually include sufficient systematic bits to make RV #3 self-decodable. Therefore, for any code rate that fulfills the equation below, RV #3 is self-decodable.

$$r \leq \frac{32}{(22+30)} = 0.615$$

Assuming 100 resource blocks, 256 QAM disabled, and an UL starting point at OS #0, out of the 29 MCS indices for single codeword LTE UL, only 8 MCS indices (MCS #18-20, #24-28) have code rate higher than the threshold. This means that any other MCS with RV #3 is self-decodable and does not require RV #0 to successfully recover the data. Tables 1 and 2 below show an example of the code rate for different starting points assuming rate matching is used for start points later than OS #0 and assuming system bandwidth of 20 MHz (100RB), as an example. MCS indices with code rate higher than the threshold are bolded in Tables 1 and 2. The benefits of retransmitting with RV #3 when the code rate of the initial transmission is below the threshold may be as follows:

If the initial transmission was indeed not received by the network node 14, RV #3 can achieve similar or slightly better performance than RV #0 because fewer or no systematic bits in the case of retransmission with RV #3.

If the initial transmission (by e.g., wireless device 16) was received by the network node 14, RV #3 can achieve much better performance than RV #0 because the network node 14 can combine the received signals from multiple transmissions and thereby can obtain more parity bits for decoding. More specifically, retransmission (by e.g., wireless device 16) with RV #0 gives 30 systematic bit columns and at least 22 parity bit columns. Retransmission (by e.g., wireless device 16) with RV #3 gives at least 30 systematic bit columns and at least 44 parity bit columns. The additional parity bits may allow the network node 14 decoder to correct more errors caused by noise and interference and thus, can achieve much higher link performance.

Using the same analysis, RV #2 is self-decodable if:

$$r \leq 32/(24+22+30) = 0.4211$$

MCS #0-6 and #11-13 provide r≤0.4211 is highlighted in italics in Tables 1 and 2 below.

Similarly, RV #1 is self-decodable if:

$$r \leq 32/(24+24+22+24) = 0.3404$$

TABLE 1

Code rate for different starting positions, 100 RB, and 256 QAM disabled

| MCS index | mod. | r × 1024 | starting position | | |
|---|---|---|---|---|---|
| | | | OS #0 | OS#1 | OS#2 |
| 0 | 2 | 100 | *0.10* | *0.11* | *0.12* |
| 1 | 2 | 130.83 | *0.13* | *0.14* | *0.15* |
| 2 | 2 | 160.83 | *0.16* | *0.17* | *0.19* |
| 3 | 2 | 209.17 | *0.20* | *0.22* | *0.25* |
| 4 | 2 | 256.67 | *0.25* | *0.27* | *0.30* |
| 5 | 2 | 315.83 | *0.31* | *0.34* | *0.37* |
| 6 | 2 | 374.17 | *0.37* | *0.40* | 0.44 |
| 7 | 2 | 438.33 | 0.43 | 0.47 | 0.51 |
| 8 | 2 | 501.67 | 0.49 | 0.53 | 0.59 |
| 9 | 2 | 565.83 | 0.55 | 0.60 | 0.66 |
| 10 | 2 | 630 | 0.62 | 0.67 | 0.74 |
| 11 | 4 | 315 | *0.31* | *0.34* | *0.37* |
| 12 | 4 | 361.67 | *0.35* | *0.39* | 0.42 |
| 13 | 4 | 408.33 | *0.40* | 0.44 | 0.48 |
| 14 | 4 | 460.83 | 0.45 | 0.49 | 0.54 |
| 15 | 4 | 513.33 | 0.50 | 0.55 | 0.60 |
| 16 | 4 | 548.33 | 0.54 | 0.58 | 0.64 |
| 17 | 4 | 582.5 | 0.57 | 0.62 | 0.68 |
| 18 | 4 | 646.25 | 0.63 | 0.69 | 0.76 |
| 19 | 4 | 708.75 | 0.69 | 0.76 | 0.83 |
| 20 | 4 | 770 | 0.75 | 0.82 | 0.90 |
| 21 | 6 | 513.33 | 0.50 | 0.55 | 0.60 |
| 22 | 6 | 555 | 0.54 | 0.59 | 0.65 |
| 23 | 6 | 599.17 | 0.59 | 0.64 | 0.70 |
| 24 | 6 | 643.33 | 0.63 | 0.69 | 0.75 |
| 25 | 6 | 685 | 0.67 | 0.73 | 0.80 |
| 26 | 6 | 727.5 | 0.71 | 0.78 | 0.85 |
| 27 | 6 | 758.33 | 0.74 | 0.81 | 0.89 |
| 28 | 6 | 895.33 | 0.87 | 0.95 | 1.05 |

TABLE 2

Code rate for different starting positions, 100 RB, and 256 QAM enabled

| MCS index | Mod | TBS (transport block size) | starting OS OS#0 | OS#1 | OS#2 |
|---|---|---|---|---|---|
| 0 | 2 | 2792 | *0.10* | *0.11* | *0.12* |
| 1 | 2 | 4584 | *0.16* | *0.17* | *0.19* |
| 2 | 2 | 7224 | *0.25* | *0.27* | *0.30* |
| 3 | 2 | 10296 | *0.36* | *0.39* | 0.43 |
| 4 | 2 | 14112 | 0.49 | 0.53 | 0.59 |
| 5 | 2 | 17568 | 0.61 | 0.67 | 0.73 |
| 6 | 4 | 19848 | *0.34* | *0.38* | *0.41* |
| 7 | 4 | 22920 | *0.40* | 0.43 | 0.48 |
| 8 | 4 | 25456 | 0.44 | 0.48 | 0.53 |
| 9 | 4 | 28336 | 0.49 | 0.54 | 0.59 |
| 10 | 4 | 32856 | 0.57 | 0.62 | 0.68 |
| 11 | 4 | 36696 | 0.64 | 0.70 | 0.76 |
| 12 | 4 | 39232 | 0.68 | 0.74 | 0.82 |
| 13 | 4 | 43816 | 0.76 | 0.83 | 0.91 |
| 14 | 6 | 46888 | 0.54 | 0.59 | 0.65 |
| 15 | 6 | 51024 | 0.59 | 0.64 | 0.71 |
| 16 | 6 | 55056 | 0.64 | 0.70 | 0.76 |
| 17 | 6 | 57336 | 0.66 | 0.72 | 0.80 |
| 18 | 6 | 61664 | 0.71 | 0.78 | 0.86 |
| 19 | 6 | 63776 | 0.74 | 0.81 | 0.89 |
| 20 | 6 | 66592 | 0.77 | 0.84 | 0.92 |
| 21 | 6 | 71112 | 0.82 | 0.90 | 0.99 |
| 22 | 8 | 73712 | 0.64 | 0.70 | 0.77 |
| 23 | 8 | 78704 | 0.68 | 0.75 | 0.82 |
| 24 | 8 | 81176 | 0.70 | 0.77 | 0.85 |
| 25 | 8 | 84760 | 0.74 | 0.80 | 0.88 |
| 26 | 8 | 93800 | 0.81 | 0.89 | 0.98 |
| 27 | 8 | 97896 | 0.85 | 0.93 | 1.02 |
| 28 | 8 | 105528 | 0.92 | 1.00 | 1.10 |

Based on the above analysis, one can show that for better performance, the RV value should not be fixed for autonomous UL retransmission. In the following, algorithms for RV selection for initial transmissions and retransmissions are proposed. For retransmission (by e.g., wireless device 16), in some embodiments, the algorithms are applicable when the wireless device 16 receives explicit NACK and/or does not receive ACK/NACK feedbacks from the network node 14. As a non-limiting example, the wireless device 16 may not receive ACK/NACK if (1) if the network node 14 missed the wireless device's 16 transmission and hence does not respond; or (2) the wireless device 16 missed the ACK/NACK feedbacks from the network node 14.

RV Selection for Initial Transmission:

If link adaptation is network node 14 controlled, the network node 14 provides an MCS index to be used in all autonomous UL transmissions. Given the MCS index and the allocated frequency resources, the wireless device 16 can calculate the code rate for the transmission.

In one embodiment, the wireless device 16 selects the RV value for the initial transmission based on the code rate. For example:
  if the code rate is greater than the threshold R, the wireless device 16 transmits with RV #0. where, R=0.6154,
  else the wireless device 16 transmits with RV #3.

In another embodiment, the wireless device 16 selects the RV value for the initial transmission based on the code rate:
  if the code rate is greater than the threshold R, the wireless device 16 transmits with RV #0, where, R=0.6154,
  else if the code rate is greater than 0.4211, the wireless device 16 transmits with RV #3,
  else the wireless device 16 transmits with RV #2.

In one further embodiment, the wireless device 16 selects the RV value for the initial transmission based on the code rate:
  if the code rate is greater than the threshold R, the wireless device 16 can transmit with RV #0, where, R=0.6154,
  else if the code rate is greater than 0.4211, the wireless device 16 can transmit with RV #3,
  else if the code rate is greater than 0.3404, the wireless device 16 transmits with RV #2,
  else any RV value can be used.

RV Selection for Retransmission when Previous Transmission is with RV #0:

In one embodiment, the wireless device 16 follows the following procedure to attempt to optimize performance:
  if the code rate for the previous transmission is greater than the threshold R, the wireless device 16 can retransmit with RV #0, where, R=0.6154 (As a non-limiting example, if the wireless device 16 is not configured 256 QAM and is allocated full 20 MHz bandwidth and OS #0 as a starting point, r≥0.6154 corresponds to MCS indices #18-20, #24-28.),
  otherwise, the wireless device 16 can retransmit with RV #3.

As another embodiment, the wireless device 16 follows the following procedure to attempt to optimize performance:
  if the code rate for the previous transmission is greater than the threshold R, the wireless device 16 can retransmit with RV #0, where, R=0.6154,
  else if r≤0.4211, the wireless device 16 can retransmit with RV #2 (As a non-limiting example, if the wireless device 16 is not configured 256 QAM and is allocated full 20 MHz bandwidth, and OS #0 as a starting point, r≤0.4211 corresponds to MCS indices #0-6 and #11-13.),
  else, the wireless device 16 can retransmit with RV #3.

As another embodiment, the wireless device 16 follows the following procedure to attempt to optimize performance:
  if the code rate is greater than the threshold R, the wireless device 16 can retransmit with RV #0, where, R=0.6154,
  else if the code rate is greater than 0.4211, the wireless device 16 can retransmit with RV #3 or RV #0, preferably RV #3 since it does not include puncturing of column 0 and 1 of the systematic bits,
  else if the code rate is greater than 0.3404, the wireless device 16 should not retransmit with RV #2,
  else any RV value can be used.

RV Selection for Retransmission when Previous Transmission is with RV #3:

In one embodiment, the wireless device 16 follows the following procedure to attempt to optimize performance:
  if the code rate for the previous transmission is greater than the threshold R, the wireless device 16 can retransmit with RV #3, where, R=0.6154 (As a non-limiting example, if the wireless device 16 is not configured 256 QAM and is allocated full 20 MHz bandwidth and OS #0 as a starting point, r≥0.6154 corresponds to MCS indices #18-20, #24-28.),
  otherwise, the wireless device 16 can retransmit with RV #0.

RV Selection for Retransmission when Previous Transmission is with RV #2:

In one embodiment, the wireless device 16 retransmits with RV #3.

In another embodiment, the wireless device 16 retransmits with RV #3 or #0.

RV Selection for Retransmission when Previous Transmission is with RV #1:

In one embodiment, the wireless device 16 retransmits with RV #0 or #2 or #3.

According to some embodiments, the wireless device 16 uses [RV #0, RV #3] alternatingly for different transmissions of the same data if the code rate for said transmissions is below the threshold of 32/52 and uses RV #0 for the different transmissions of the same data if the code rate is above the threshold.

According to some embodiments, the wireless device 16 uses RV #0 and RV #2 alternatingly for different transmissions of the same data if the code rate for said transmissions is below a first threshold of 32/76; uses RV #0 for the different transmissions of the same data if the code rate is above a second threshold of 32/52; and uses RV #0 and RV #3 alternatingly for the different transmissions of the same data if the code rate is between the first and second thresholds.

According to some embodiments, the wireless device 16 uses RV #2 and RV #3 alternatingly for different transmissions of the same data if the code rate for the transmissions is below the threshold of 32/76.

Any of the above embodiments can be implemented with a look up table in the wireless device 16 such that each modulation and coding scheme (MCS) is associated with a preferred RV for initial retransmission. Said associated preferred RV is determined based on the code rate rules provided in said above embodiments.

Alternative Embodiments Based on Look-Up Tables

Any combination of the above embodiments for initial transmission and embodiments for retransmission can be implemented with a look up table in the wireless device 16 such that each MCS is associated with a preferred RV for initial retransmission and a preferred RV for retransmission. Said associated preferred RVs are determined based on the code rate rules provided in said above embodiments.

If the wireless device 16 can transmit with variable duration within a subframe, the look up table for any of the above embodiments can associate each MCS with different preferred RV(s) for each transmission duration.

Configurability Embodiments

For any of the above embodiments, the wireless device 16 may receive the threshold code rate(s) from high layer configuration from the network node 14. Said high layer configuration of said threshold code rate(s) can include the preferred RV(s) for said threshold code rate(s). One non-limiting example of high layer configuration is via radio resource control signaling.

For any of the above embodiments, the wireless device 16 may receive the look-up table from high layer configuration from the network node 14. One non-limiting example of high layer configuration is via radio resource control signaling.

It should be understood that the examples used herein are for illustrative purposes and are not intended to be limiting. For example, other embodiments may include more or less than 4 RVs and other threshold values than those used in the examples.

In some embodiments, a method in a wireless device 16 for transmission of redundancy versions in a hybrid automatic repeat request, HARQ, process, is provided. In some embodiments, the method may include comparing a coding rate to a first threshold; and determining a redundancy version, RV, for transmission by the wireless device 16 based on the comparison.

In some embodiments, the first threshold is based on a function of a number of parity bit columns and a number of systematic bit columns in a readable coded bit buffer. In some embodiments, when the coding rate exceeds the first threshold, the wireless device 16 transmits with RV #0. In some embodiments, when the coding rate falls below the first threshold, but exceeds a second threshold lower than the first threshold, the wireless device 16 transmits with RV #3. In some embodiments, when the coding rate falls below the second threshold, but exceeds a third threshold lower than the second threshold, the wireless device 16 transmits with RV #2. In some embodiments, when the coding rate falls below the third threshold, the wireless device 16 may transmit with any RV. In some embodiments, when the coding rate exceeds the first threshold, the wireless device transmits with RV #3.

In some embodiments, a wireless device 16 is configured for transmission of redundancy versions in a hybrid automatic repeat request, HARQ, process. The wireless device 16 includes processing circuitry configured to: compare a coding rate to a first threshold; and determine a redundancy version, RV, for transmission by the wireless device 16 based on the comparison.

In some embodiments, the first threshold is based on a function of a number of parity bit columns and a number of systematic bit columns in a readable coded bit buffer. In some embodiments, when the coding rate exceeds the first threshold, the wireless device 16 transmits with RV #0. In some embodiments, when the coding rate falls below the first threshold, but exceeds a second threshold lower than the first threshold, the wireless device 16 transmits with RV #3. In some embodiments, when the coding rate falls below the second threshold, but exceeds a third threshold lower than the second threshold, the wireless device 16 transmits with RV #2. In some embodiments, when the coding rate falls below the third threshold, the wireless device 16 may transmit with any RV. In some embodiments, when the coding rate exceeds the first threshold, the wireless device transmits with RV #3.

In some embodiments, a wireless device 16 is configured for transmission of redundancy versions in a hybrid automatic repeat request, HARQ, process. The wireless device 16 includes a comparator module configured to compare a coding rate to a first threshold; and a redundancy version determiner module configured to determine a redundancy version, RV, for transmission by the wireless device 16 based on the comparison.

In some embodiments, a method in a network node 14 for performing a hybrid automatic repeat request, HARQ, process is provided. The method includes transmitting to a wireless device 16 a modulation and coding scheme, MCS, index to enable the wireless device 16 to calculate a coding rate; and receiving a redundancy version (RV) from the wireless device 16, the RV being selected based on a comparison of the coding rate to a first threshold.

In some embodiments, the method further includes transmitting to the wireless device 16 an identity of a preferred RV corresponding to the first threshold. In some embodiments, the method further includes transmitting to the wireless device 16 a lookup table that associates an MCS with a preferred RV.

In some embodiments, a network node 14 is configured to perform a hybrid automatic repeat request, HARQ, process. The network node 14 includes a transceiver configured to: transmit to a wireless device 16 a modulation and coding scheme, MCS, index to enable the wireless device 16 to calculate a coding rate; and receive a redundancy version (RV) from the wireless device 16, the RV being selected based on a comparison of the coding rate to a first threshold.

In some embodiments, the transceiver is further configured to transmit to the wireless device 16 an identity of a preferred RV corresponding to the first threshold. In some embodiments, the transceiver is further configured to transmit to the wireless device 16 a lookup table that associates an MCS with a preferred RV.

In some embodiments, a network node 14 is configured to perform a hybrid automatic repeat request, HARQ, process, the network node 14 includes a transceiver module configured to transmit to a wireless device 16 a modulation and coding scheme, MCS, index to enable the wireless device 16 to calculate a coding rate; and receive a redundancy version (RV) from the wireless device 16, the RV being selected based on a comparison of the coding rate to a first threshold.

Abbreviation Explanation

BSR Buffer Status Request
CC Component Carrier
CCA Clear Channel Assessment
CQI Channel Quality Information
CRC Cyclic Redundancy Check
DCI Downlink Control Information
DL Downlink
DMTC DRS Measurement Timing Configuration
DRS Discovery Reference Signal
eNB evolved NodeB
UE User Equipment
UL Uplink
LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TXOP Transmission Opportunity
UL Uplink As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a wireless device for transmission comprising redundancy in a hybrid automatic repeat request, HARQ, process, the wireless device receiving neither an ACK message nor a NACK message from a network node serving the wireless device for a previous transmission from the network node, the method comprising:
  determining, by the wireless device, a redundancy version, RV, for a transmission by the wireless device, the RV being based at least on a coding rate;
  the determining further comprising:
    determining the coding rate;
    comparing the determined coding rate to at least a first threshold to determine the RV, the first threshold being based on a function of a number of parity bit columns and a number of systematic bit columns in a circularly-readable coded bit buffer; and
    when the coding rate exceeds the first threshold, the determined RV for the transmission is RV #0; and
  performing the transmission according to the determined redundancy version.

2. The method of claim 1, wherein the determining the RV for the transmission by the wireless device further comprises:
  determining that the coding rate corresponds to a self-decodable transmission for the RV.

3. The method of claim 2, wherein the self-decodable transmission includes a predetermined number of systematic bits.

4. The method of claim 2, wherein the self-decodable transmission includes all systematic bits in the circularly-readable coded bit buffer, the circularly-readable coded bit buffer including a number systematic bits and a number of parity bits.

5. The method of claim 1, wherein the transmission by the wireless device is an autonomous uplink, UL, retransmission by the wireless device.

6. The method of claim 1, wherein the determining the coding rate further comprises identifying the coding rate in a table, the coding rate corresponding to a received MCS index and at least one starting position of the-circularly-readable coded bit buffer.

7. The method of claim 1, wherein the comparing the determined coding rate to the at least the first threshold further comprises at least one of:
  when the coding rate at most meets the first threshold, the determined RV for the transmission is RV #3; and
  when the coding rate at most meets the first threshold and exceeds a second threshold, the determined RV for the transmission is RV #3, the second threshold being lower than the first threshold.

8. The method of claim 1, wherein the comparing the determined coding rate to the at least the first threshold further comprises:
  when the coding rate at most meets the first threshold and exceeds a second threshold, the determined RV for the transmission is RV #3, the second threshold being lower than the first threshold.

9. The method of claim 8, wherein, when the coding rate at most meets the second threshold and exceeds a third threshold, the determined RV for the transmission is RV #2, the third threshold being lower than the second threshold.

10. The method of claim 9, wherein, when the coding rate at most meets the third threshold, the determined RV for the transmission is any one of RV #0, RV #1, RV #2, and RV #3.

11. The method of claim 1, wherein the determining the coding rate further comprises determining the coding rate for a previous transmission by the wireless device and at least one of:
  when the previous transmission is with RV #3, if the coding rate exceeds the first threshold, the determined RV is for a retransmission with RV #3, otherwise the determined RV is for a retransmission with RV #0; and
  when the previous transmission is with RV #2, the determined RV is for a retransmission with one of RV #0 and RV #3.

12. The method of claim 11, wherein, when the previous transmission is with RV #1, the determined RV is for a retransmission with one of RV #0, RV #2, and RV #3.

13. A wireless device for transmission comprising redundancy in a hybrid automatic repeat request, HARQ, process, the wireless device receiving neither an ACK message nor a NACK message from a network node serving the wireless device for a previous transmission from the network node, the wireless device comprising:
  processing circuitry, the processing circuitry configured to determine, by the wireless device, a redundancy version, RV, for a transmission by the wireless device, the RV being based at least on a coding rate, the determining further comprising:
    determining the coding rate;
    comparing the determined coding rate to at least a first threshold to determine the RV, the first threshold being based on a function of a number of parity bit columns and a number of systematic bit columns in a circularly-readable coded bit buffer; and
    when the coding rate exceeds the first threshold, the determined RV for the transmission is RV #0; and
  a transceiver, the transceiver configured to perform the transmission according to the determined redundancy version.

14. The wireless device of claim 13, wherein the processing circuitry is further configured to compare the determined coding rate to the at least the first threshold by being further configured to at least one of:
  when the coding rate at most meets the first threshold, determine that the RV for the transmission is RV #3;
  when the coding exceeds a second threshold, determine that the RV for the transmission is RV #3, the second threshold being lower than the first threshold;
  when the coding rate at most meets the second threshold and exceeds a third threshold, determine that the RV for the transmission is RV #2, the third threshold being lower than the second threshold; and
  when the coding rate at most meets the third threshold, determine that the RV for the transmission is any one of RV #0, RV #1, RV #2, and RV #3.

15. The wireless device of claim 13, wherein the processing circuitry is further configured to determine the coding rate by being further configured to determine the coding rate for a previous transmission by the wireless device; and at least one of:
  when the previous transmission is with RV #3, if the coding rate exceeds the first threshold, determine that the RV is for a retransmission with RV #3, otherwise the determined RV is for a retransmission with RV #0;
  when the previous transmission is with RV #2, determine that the RV is for a retransmission with one of RV #0 and RV #3; and
  when the previous transmission is with RV #1, determine that the RV is for a retransmission with one of RV #0, RV #2, and RV #3.

16. A method performed by a network node serving a wireless device for performing a hybrid automatic repeat request, HARQ, process, the method comprising:
  receiving, from the wireless device, a transmission corresponding to a redundancy version, RV, the RV being based at least on a coding rate, such that when the wireless device received neither an ACK message nor a NACK message for a previous transmission from the network node, the RV is determined by the wireless device by comparing the coding rate to at least a first threshold, the first threshold being based on a function of a number of parity bit columns and a number of systematic bit columns in a circularly-readable coded bit buffer, and when the coding rate exceeds the first threshold, the determined RV for the transmission is RV #0.

17. The method of claim 16, further comprising:
communicating, to the wireless device, at least one of:
   at least one identity of the RV based at least on the coding rate;
   at least a first threshold coding rate to the wireless device, the RV being further based on a comparison of the coding rate and the at least the first threshold; and a second threshold coding rate, and a third threshold coding rate, wherein the second threshold coding rate is less than the first threshold coding rate and third threshold coding rate is less than the second threshold code rate.

18. A network node serving a wireless device configured to perform a hybrid automatic repeat request, HARQ, process, the network node comprising processing circuitry, the processing circuitry configured to:
   receive, from the wireless device, a transmission corresponding to a redundancy version, RV, the RV being based at least on a coding rate, such that when the wireless device received neither an ACK message nor a NACK message for a previous transmission from the network node, the RV is determined by the wireless device by comparing the coding rate to at least a first threshold, the first threshold being based on a function of a number of parity bit columns and a number of systematic bit columns in a circularly-readable coded bit buffer, and when the coding rate exceeds the first threshold, the determined RV for the transmission is RV #0.

19. The network node of claim 18, wherein the processing circuitry is further configured to:
   communicate, to the wireless device, at least one of:
      at least one identity of the RV based at least on the coding rate;
      at least a first threshold coding rate to the wireless device, the RV being further based on a comparison of the coding rate and the at least the first threshold; and
      a second threshold coding rate, and a third threshold coding rate, wherein the second threshold coding rate is less than the first threshold coding rate and the third threshold coding rate is less than the second threshold code rate.

* * * * *